US011050546B2

(12) United States Patent
Bendlin et al.

(10) Patent No.: US 11,050,546 B2
(45) Date of Patent: Jun. 29, 2021

(54) PHYSICAL DOWNLINK SHARED CHANNEL TIME DOMAIN RESOURCE ALLOCATION FOR 5G OR OTHER NEXT GENERATION NETWORK

(71) Applicant: AT&T Intellectual Property I, L.P., Atlanta, GA (US)

(72) Inventors: Ralf Bendlin, Cedar Park, TX (US); Thomas Novlan, Austin, TX (US); Arunabha Ghosh, Austin, TX (US)

(73) Assignee: AT&T INTELLECTUAL PROPERTY I, L.P., Atlanta, GA (US)

( * ) Notice: Subject to any disclaimer, the term of this patent is extended or adjusted under 35 U.S.C. 154(b) by 102 days.

(21) Appl. No.: 15/967,131

(22) Filed: Apr. 30, 2018

(65) Prior Publication Data

US 2019/0334691 A1    Oct. 31, 2019

(51) Int. Cl.
*H04B 7/024* (2017.01)
*H04W 72/04* (2009.01)
(Continued)

(52) U.S. Cl.
CPC .......... *H04L 5/1469* (2013.01); *H04L 5/0048* (2013.01); *H04L 5/0083* (2013.01); *H04W 72/042* (2013.01); *H04W 72/0446* (2013.01)

(58) Field of Classification Search
CPC ... H04L 5/0053; H04L 5/1469; H04L 5/0048; H04L 5/006; H04L 5/0083; H04L 5/0096;
(Continued)

(56) References Cited

U.S. PATENT DOCUMENTS

2015/0124748 A1   5/2015  Park et al.
2016/0095108 A1   3/2016  Ryoo et al.
(Continued)

FOREIGN PATENT DOCUMENTS

WO   2013009145 A2   1/2013
WO   2017169003 A1   10/2017
(Continued)

OTHER PUBLICATIONS

Ahmadi, Sassan. "Toward 5G Xilinx Solutions and Enablers for Next-Generation Wireless Systems." White Paper: Xilinx MPSoCs and FPGAs; Jun. 13, 2016; (pp. 9-11). https://pdfs.semanticscholar.org/d456/87958f1472bb0dc8b3e124f4376bfdc6ada1.pdf.
(Continued)

*Primary Examiner* — Edan Orgad
*Assistant Examiner* — Vanneilian Lalchinthang
(74) *Attorney, Agent, or Firm* — Amin, Turocy & Watson, LLP

(57) ABSTRACT

Time domain resource allocation is facilitated for a physical downlink shared channel. For instance, a physical downlink shared channel associated with a mobile device can be configured via a broadcast channel, and a data structure associated with the physical downlink shared channel corresponding to a physical downlink control channel can also be configured. The configured data structure can be sent to the mobile device to be utilized for physical downlink shared channel transmissions between the wireless network device and the mobile device. Additionally, the time domain resources can be allocated by transmitting a physical downlink shared channel transmission to the mobile device based on a condition associated with a radio resource control connection being determined to not have been satisfied.

20 Claims, 12 Drawing Sheets

(51) Int. Cl.
*H04W 48/16* (2009.01)
*H04L 5/14* (2006.01)
*H04L 5/00* (2006.01)

(58) Field of Classification Search
CPC ..... H04B 7/024; H04B 7/0626; H04W 16/14; H04W 72/042; H04W 56/00; H04W 48/10; H04W 72/0446; H04W 74/0891; H04W 76/40
USPC .......................................................... 370/329
See application file for complete search history.

(56) References Cited

U.S. PATENT DOCUMENTS

| | | | |
|---|---|---|---|
| 2017/0257860 A1 | 9/2017 | Nam et al. | |
| 2017/0289971 A1 | 10/2017 | Wu et al. | |
| 2017/0310431 A1 | 10/2017 | Iyer et al. | |
| 2017/0332372 A1* | 11/2017 | Lee | H04W 72/0413 |
| 2017/0353947 A1* | 12/2017 | Ang | H04B 7/0413 |
| 2017/0366377 A1* | 12/2017 | Papasakellariou | H04L 1/0026 |
| 2017/0367046 A1* | 12/2017 | Papasakellariou | H04W 52/0216 |
| 2018/0042028 A1* | 2/2018 | Nam | H04L 5/0035 |
| 2018/0063818 A1* | 3/2018 | Chen | H04W 24/02 |
| 2018/0070369 A1* | 3/2018 | Papasakellariou | H04W 72/1215 |
| 2018/0092085 A1* | 3/2018 | Shaheen | H04W 28/08 |
| 2018/0098361 A1* | 4/2018 | Ji | H04L 45/00 |
| 2018/0279303 A1* | 9/2018 | Sun | H04W 16/14 |
| 2019/0297629 A1* | 9/2019 | Lin | H04L 5/0044 |

FOREIGN PATENT DOCUMENTS

| | | |
|---|---|---|
| WO | 2017188733 A1 | 11/2017 |
| WO | 2017196083 | 11/2017 |
| WO | 2017213386 A1 | 12/2017 |
| WO | 2018016794 A1 | 1/2018 |
| WO | 2018031395 A1 | 2/2018 |
| WO | 2018031623 A1 | 2/2018 |
| WO | 2018045307 A1 | 3/2018 |
| WO | 2018064313 A1 | 4/2018 |
| WO | 2018064407 A1 | 4/2018 |

OTHER PUBLICATIONS

Salihu, Bala Alhaji. "Adaptive Enhanced Physical Downlink Control Channel (EPDDCH) for LTE-Advanced Systems??." Journal of Computational Information Systems 8.1 (2014): 1-8. https://www.researchgate.net/profile/Bala_Salihu/publication/269101770_Adaptive_enhanced_physical_downlink_control_channel_EPDDCH_for_LTE-advanced_systems/links/592fc17f45851553b67ed0a6/Adaptive-enhancedphysical-downlink-control-channel-EPDDCH-for-LTE-advanced-systems.pdf.
Jeon, Jeongho. "NR Wide Bandwidth Operations." IEEE Communications Magazine (2017). https://arxiv.org/pdf/1712.09724.
Bloor, Alexander. "Decision Criterion for Observation-Based Relays in LTE Networks." Diss. Apr. 2016. http://qspace.library.queensu.ca/bitstream/handle/1974/14198/bloor_alexander_1_201604_MASC.pdf?sequence=1.
International Search Report dated Jul. 15, 2019 for PCT Application No. PCT/US20191025455, 76 pages.
"3GPP TS 38.331 V15.1.0, 3rd Generation Partnership Project; Technical Specification Group Radio Access Network; NR; Radio Resource Control (RRC) protocol specification" 3GPP, Mar. 2018, 268 pages.

* cited by examiner

PHYSICAL DOWNLINK SHARED CHANNEL TIME DOMAIN RESOURCE ALLOCATION FOR 5G OR OTHER NEXT GENERATION NETWORK

TECHNICAL FIELD

This disclosure relates generally to facilitating physical downlink shared channel time domain resource allocation. For example, this disclosure relates to facilitating physical downlink shared channel time domain resource allocation based on a slot configuration for a 5G, or other next generation network, air interface.

BACKGROUND

5th generation (5G) wireless systems represent a next major phase of mobile telecommunications standards beyond the current telecommunications standards of $4^{th}$ generation (4G). Rather than faster peak Internet connection speeds, 5G planning aims at higher capacity than current 4G, allowing a higher number of mobile broadband users per area unit, and allowing consumption of higher or unlimited data quantities. This would enable a large portion of the population to stream high-definition media many hours per day with their mobile devices, when out of reach of wireless fidelity hotspots. 5G research and development also aims at improved support of machine-to-machine communication, also known as the Internet of things, aiming at lower cost, lower battery consumption, and lower latency than 4G equipment.

The above-described background relating to facilitating physical downlink shared channel time domain resource allocation is merely intended to provide a contextual overview of some current issues, and is not intended to be exhaustive. Other contextual information may become further apparent upon review of the following detailed description.

BRIEF DESCRIPTION OF THE DRAWINGS

Non-limiting and non-exhaustive embodiments of the subject disclosure are described with reference to the following figures, wherein like reference numerals refer to like parts throughout the various views unless otherwise specified.

DETAILED DESCRIPTION

Figure 1:
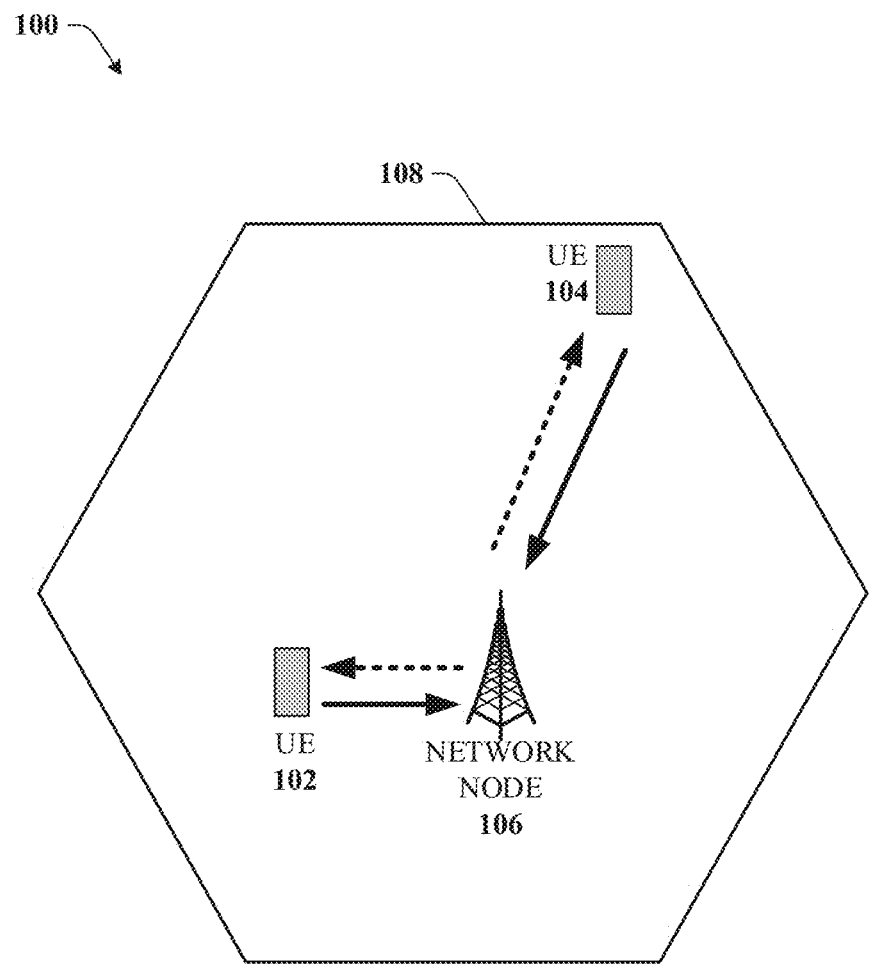
FIG. 1 illustrates an example wireless communication system in which a network node device (e.g., network node) and user equipment (UE) can implement various aspects and embodiments of the subject disclosure.

In the following description, numerous specific details are set forth to provide a thorough understanding of various embodiments. One skilled in the relevant art will recognize, however, that the techniques described herein can be practiced without one or more of the specific details, or with other methods, components, materials, etc. In other instances, well-known structures, materials, or operations are not shown or described in detail to avoid obscuring certain aspects.

Reference throughout this specification to "one embodiment," or "an embodiment," means that a particular feature, structure, or characteristic described in connection with the embodiment is included in at least one embodiment. Thus, the appearances of the phrase "in one embodiment," "in one aspect," or "in an embodiment," in various places throughout this specification are not necessarily all referring to the same embodiment. Furthermore, the particular features, structures, or characteristics may be combined in any suitable manner in one or more embodiments.

As utilized herein, terms "component," "system," "interface," and the like are intended to refer to a computer-related entity, hardware, software (e.g., in execution), and/or firmware. For example, a component can be a processor, a process running on a processor, an object, an executable, a program, a storage device, and/or a computer. By way of illustration, an application running on a server and the server can be a component. One or more components can reside within a process, and a component can be localized on one computer and/or distributed between two or more computers.

Further, these components can execute from various machine-readable media having various data structures stored thereon. The components can communicate via local and/or remote processes such as in accordance with a signal having one or more data packets (e.g., data from one component interacting with another component in a local system, distributed system, and/or across a network, e.g., the Internet, a local area network, a wide area network, etc. with other systems via the signal).

As another example, a component can be an apparatus with specific functionality provided by mechanical parts operated by electric or electronic circuitry; the electric or electronic circuitry can be operated by a software application or a firmware application executed by one or more processors; the one or more processors can be internal or external to the apparatus and can execute at least a part of the software or firmware application. As yet another example, a component can be an apparatus that provides specific functionality through electronic components without mechanical parts; the electronic components can include one or more processors therein to execute software and/or firmware that confer(s), at least in part, the functionality of the electronic components. In an aspect, a component can emulate an electronic component via a virtual machine, e.g., within a cloud computing system.

The words "exemplary" and/or "demonstrative" are used herein to mean serving as an example, instance, or illustration. For the avoidance of doubt, the subject matter disclosed herein is not limited by such examples. In addition, any aspect or design described herein as "exemplary" and/or "demonstrative" is not necessarily to be construed as preferred or advantageous over other aspects or designs, nor is it meant to preclude equivalent exemplary structures and techniques known to those of ordinary skill in the art. Furthermore, to the extent that the terms "includes," "has," "contains," and other similar words are used in either the detailed description or the claims, such terms are intended to be inclusive—in a manner similar to the term "comprising" as an open transition word—without precluding any additional or other elements.

As used herein, the term "infer" or "inference" refers generally to the process of reasoning about, or inferring states of, the system, environment, user, and/or intent from a set of observations as captured via events and/or data. Captured data and events can include user data, device data, environment data, data from sensors, sensor data, application data, implicit data, explicit data, etc. Inference can be employed to identify a specific context or action, or can generate a probability distribution over states of interest based on a consideration of data and events, for example.

Inference can also refer to techniques employed for composing higher-level events from a set of events and/or data. Such inference results in the construction of new events or actions from a set of observed events and/or stored event data, whether the events are correlated in close temporal proximity, and whether the events and data come from one or several event and data sources. Various classification schemes and/or systems (e.g., support vector machines, neural networks, expert systems, Bayesian belief networks, fuzzy logic, and data fusion engines) can be employed in connection with performing automatic and/or inferred action in connection with the disclosed subject matter.

In addition, the disclosed subject matter can be implemented as a method, apparatus, or article of manufacture using standard programming and/or engineering techniques to produce software, firmware, hardware, or any combination thereof to control a computer to implement the disclosed subject matter. The term "article of manufacture" as used herein is intended to encompass a computer program accessible from any computer-readable device, machine-readable device, computer-readable carrier, computer-readable media, or machine-readable media. For example, computer-readable media can include, but are not limited to, a magnetic storage device, e.g., hard disk; floppy disk; magnetic strip(s); an optical disk (e.g., compact disk (CD), a digital video disc (DVD), a Blu-ray Disc™ (BD)); a smart card; a flash memory device (e.g., card, stick, key drive); and/or a virtual device that emulates a storage device and/or any of the above computer-readable media.

As an overview, various embodiments are described herein to facilitate physical downlink shared channel time domain resource allocation for a 5G or other next generation networks. For simplicity of explanation, the methods (or algorithms) are depicted and described as a series of acts. It is to be understood and appreciated that the various embodiments are not limited by the acts illustrated and/or by the order of acts. For example, acts can occur in various orders and/or concurrently, and with other acts not presented or described herein. Furthermore, not all illustrated acts may be required to implement the methods. In addition, the methods could alternatively be represented as a series of interrelated states via a state diagram or events. Additionally, the methods described hereafter are capable of being stored on an article of manufacture (e.g., a machine-readable storage medium) to facilitate transporting and transferring such methodologies to computers. The term article of manufacture, as used herein, is intended to encompass a computer program accessible from any computer-readable device, carrier, or media, including a non-transitory machine-readable storage medium.

It should be noted that although various aspects and embodiments have been described herein in the context of 5G, Universal Mobile Telecommunications System (UMTS), and/or Long Term Evolution (LTE), or other next generation networks, the disclosed aspects are not limited to 5G, a UMTS implementation, and/or an LTE implementation as the techniques can also be applied in 3G, 4G or LTE systems. For example, aspects or features of the disclosed embodiments can be exploited in substantially any wireless communication technology. Such wireless communication technologies can include UMTS, Code Division Multiple Access (CDMA), Wi-Fi, Worldwide Interoperability for Microwave Access (WiMAX), General Packet Radio Service (GPRS), Enhanced GPRS, Third Generation Partnership Project (3GPP), LTE, Third Generation Partnership Project 2 (3GPP2) Ultra Mobile Broadband (UMB), High Speed Packet Access (HSPA), Evolved High Speed Packet Access (HSPA+), High-Speed Downlink Packet Access (HSDPA), High-Speed Uplink Packet Access (HSUPA), Zigbee, or another IEEE 802.XX technology. Additionally, substantially all aspects disclosed herein can be exploited in legacy telecommunication technologies.

Described herein are systems, methods, articles of manufacture, and other embodiments or implementations that can facilitate physical downlink shared channel time domain resource allocation for a 5G network. Facilitating physical downlink shared channel time domain resource allocation for a 5G network can be implemented in connection with any type of device with a connection to the communications network (e.g., a mobile handset, a computer, a handheld device, etc.) any Internet of things (IOT) device (e.g., toaster, coffee maker, blinds, music players, speakers, etc.), and/or any connected vehicles (cars, airplanes, space rockets, and/or other at least partially automated vehicles (e.g., drones)). In some embodiments the non-limiting term user equipment (UE) is used. It can refer to any type of wireless device that communicates with a radio network node in a cellular or mobile communication system. Examples of UE are target device, device to device (D2D) UE, machine type UE or UE capable of machine to machine (M2M) communication, PDA, Tablet, mobile terminals, smart phone, laptop embedded equipped (LEE), laptop mounted equipment (LME), USB dongles etc. Note that the terms element, elements and antenna ports can be interchangeably used but carry the same meaning in this disclosure. The embodiments are applicable to single carrier as well as to multicarrier (MC) or carrier aggregation (CA) operation of the UE. The term carrier aggregation (CA) is also called (e.g. interchangeably called) "multi-carrier system", "multi-cell operation", "multi-carrier operation", "multi-carrier" transmission and/or reception.

In some embodiments the non-limiting term radio network node or simply network node is used. It can refer to any type of network node that serves UE is connected to other network nodes or network elements or any radio node from where UE receives a signal. Examples of radio network nodes are Node B, base station (BS), multi-standard radio (MSR) node such as MSR BS, eNode B, network controller, radio network controller (RNC), base station controller (BSC), relay, donor node controlling relay, base transceiver station (BTS), access point (AP), transmission points, transmission nodes, RRU, RRH, nodes in distributed antenna system (DAS) etc.

Cloud radio access networks (RAN) can enable the implementation of concepts such as software-defined network (SDN) and network function virtualization (NFV) in 5G networks. This disclosure can facilitate a generic channel state information framework design for a 5G network. Certain embodiments of this disclosure can comprise an SDN controller that can control routing of traffic within the network and between the network and traffic destinations. The SDN controller can be merged with the 5G network architecture to enable service deliveries via open application programming interfaces ("APIs") and move the network core towards an all internet protocol ("IP"), cloud based, and software driven telecommunications network. The SDN controller can work with, or take the place of policy and charging rules function ("PCRF") network elements so that policies such as quality of service and traffic management and routing can be synchronized and managed end to end.

To meet the huge demand for data centric applications, 4G standards can be applied 5G, also called new radio (NR) access. 5G networks can comprise the following: data rates of several tens of megabits per second supported for tens of thousands of users; 1 gigabit per second can be offered simultaneously to tens of workers on the same office floor; several hundreds of thousands of simultaneous connections can be supported for massive sensor deployments; spectral efficiency can be enhanced compared to 4G; improved coverage; enhanced signaling efficiency; and reduced latency compared to LTE. In multicarrier system such as orthogonal frequency-division multiplexing (OFDM), each subcarrier can occupy bandwidth (e.g., subcarrier spacing). If the carriers use the same bandwidth spacing, then it can be considered a single numerology. However, if the carriers occupy different bandwidth and/or spacing, then it can be considered a multiple numerology.

Downlink reference signals are predefined signals occupying specific resource elements within a downlink time-frequency grid. There are several types of downlink reference signals that can be transmitted in different ways and used for different purposes by a receiving terminal. Channel state information reference signals (CSI-RS) can be used by terminals to acquire channel-state information (CSI) and beam specific information (e.g., beam reference signal received power). In 5G, CSI-RS can be user equipment (UE) specific so it can have a significantly lower time/frequency density. Demodulation reference signals (DM-RS), also sometimes referred to as UE-specific reference signals, can be used by terminals for channel estimation of data channels. The label "UE-specific" relates to the demodulation reference signal being intended for channel estimation by a single terminal. The demodulation reference signal can then be transmitted within the resource blocks assigned for data traffic channel transmission to that terminal. Other than the aforementioned reference signals, there are other reference signals, namely multi-cast broadcast single frequency network (MBSFN) and positioning reference signals that can be used for various purposes.

NR can co-exist with LTE in overlapping spectrum in both normal and MBSFN LTE DL subframes. Thus, it is possible to schedule NR physical downlink shared channel (PDSCH) transmissions in subframes with carrier routing systems (CRS). After a dedicated radio resource control (RRC) connection has been established, the LTE CRS pattern, including the MBSFN subframe configuration, can be known to the UE and the UE can rate match the NR PDSCH around the LTE CRS. Before the UE is configured with a dedicated RRC configuration, NR PDSCH transmissions can be confined to symbols between subsequent CRS transmissions. In MBSFN subframes, these can be OFDM symbols 1-13 for one or two LTE CRS ports and OFDM symbols 2-13, otherwise. Moreover, some OFDM symbols, without CRS, can be reserved for NR physical downlink control channel (PDCCH) transmissions, which can not be rate matched around LTE CRS. Because NR demodulation reference signals (DMRS) are not expected to collide with LTE CRS, possible NR PDSCH time-domain resource allocations can be restricted when NR and LTE are deployed in an overlapping spectrum.

Consequently, a configuration for PDCCH monitoring and PDSCH mapping can allow the maximum NR control-resource set (CORESET) span of three OFDM symbols for coverage in networks that deploy LTE-NR coexistence. A default PDSCH time-domain resource allocation for NR can be introduced that allows UEs to use before the UE is configured with a dedicated RRC connection. The PDSCH can utilize PDSCH mapping and starts on OFDM symbol number 5 as opposed to OFDM symbol number 4. By moving the PDSCH starting symbol from number 4 to number 5, the NR PDCCH can span up to three OFDM symbols. This can allow the same NR coverage when NR and LTE are deployed in overlapping spectrum compared to NR deployments in a dedicated spectrum. In the below tables, the "S" is the start, and the "L" is the length. Table 1—Table 4 can convey to the UE on which symbols the UE can look for the PDSCH.

TABLE 1

LTE Resource allocation for PDSCH

| i | PDSCH mapping type | $K_0$ | S | L |
|---|---|---|---|---|
| 0 | Type A | 0 | 2 | 12 |
| 1 | Type A | 0 | 2 | 10 |
| 2 | Type A | 0 | 2 | 9 |
| 3 | Type A | 0 | 2 | 8 |
| 4 | Type B | 0 | 4 | 7 |
| 5 | Type B | 0 | 4 | 4 |
| 6 | Type B | 0 | 9 | 4 |
| 7 | Type A | 0 | 3 | 11 |
| 8 | Type A | 0 | 3 | 9 |
| 9 | Type A | 0 | 3 | 8 |
| 10 | Type A | 0 | 3 | 7 |
| 11 | Type B | 0 | 3 | 4 |

TABLE 1-continued

LTE Resource allocation for PDSCH

| i | PDSCH mapping type | $K_0$ | S | L |
|---|---|---|---|---|
| 12 | Type B | 0 | 10 | 4 |
| 13 | Type B | 0 | 5 | 2 |
| 14 | Type B | 0 | 9 | 2 |
| 15 | Type B | 0 | 12 | 2 |

TABLE 2

LTE Default Resource allocation for PDSCH

| i | PDSCH mapping type | $K_0$ | S | L |
|---|---|---|---|---|
| 0 | Type A | 0 | 0 | 14 |
| 1 | Type A | 0 | 0 | 12 |
| 2 | Type A | 0 | 0 | 11 |
| 3 | Type A | 0 | 0 | 10 |
| 4 | Type A | 0 | 2 | 12 |
| 5 | Type A | 0 | 2 | 10 |
| 6 | Type A | 0 | 2 | 9 |
| 7 | Type A | 0 | 2 | 8 |
| 8* | Type A | 0 | 0 | 14 |
| 9* | Type A | 0 | 0 | 12 |
| 10* | Type A | 0 | 0 | 11 |
| 11* | Type A | 0 | 0 | 10 |
| 12 | Type A | 0 | 3 | 11 |
| 13 | Type A | 0 | 3 | 9 |
| 14 | Type A | 0 | 3 | 8 |
| 15 | Type A | 0 | 3 | 7 |
| 8** | Type B | 0 | 4 | 7 |
| 9** | Type B | 0 | 5 | 2 |
| 10** | Type B | 0 | 9 | 2 |
| 11** | Type B | 0 | 12 | 2 |

*Applicable only if scheduled with a CORESET residing within the first two symbols in the slot
**not applicable if CORESET not in the first two symbols of the slot

TABLE 3

NR and LTE Resource allocation for PDSCH

| i | PDSCH mapping type | $K_0$ | S | L |
|---|---|---|---|---|
| 0 | Type A | 0 | 2 | 12 |
| 1 | Type A | 0 | 2 | 10 |
| 2 | Type A | 0 | 2 | 9 |
| 3 | Type A | 0 | 2 | 8 |
| 4 | Type B | 0 | 5 | 7 |
| 5 | Type B | 0 | 4 | 4 |
| 6 | Type B | 0 | 9 | 4 |
| 7 | Type A | 0 | 3 | 11 |
| 8 | Type A | 0 | 3 | 9 |
| 9 | Type A | 0 | 3 | 8 |
| 10 | Type A | 0 | 3 | 7 |
| 11 | Type B | 0 | 3 | 4 |
| 12 | Type B | 0 | 10 | 4 |
| 13 | Type B | 0 | 5 | 2 |
| 14 | Type B | 0 | 9 | 2 |
| 15 | Type B | 0 | 12 | 2 |

TABLE 4

NR and LTE Default Resource allocation for PDSCH

| i | PDSCH mapping type | $K_0$ | S | L |
|---|---|---|---|---|
| 0 | Type A | 0 | 0 | 14 |
| 1 | Type A | 0 | 0 | 12 |
| 2 | Type A | 0 | 0 | 11 |
| 3 | Type A | 0 | 0 | 10 |
| 4 | Type A | 0 | 2 | 12 |

TABLE 4-continued

NR and LTE Default Resource allocation for PDSCH

| i | PDSCH mapping type | $K_0$ | S | L |
|---|---|---|---|---|
| 5 | Type A | 0 | 2 | 10 |
| 6 | Type A | 0 | 2 | 9 |
| 7 | Type A | 0 | 2 | 8 |
| 8* | Type A | 0 | 0 | 14 |
| 9* | Type A | 0 | 0 | 12 |
| 10* | Type A | 0 | 0 | 11 |
| 11* | Type A | 0 | 0 | 10 |
| 12 | Type A | 0 | 3 | 11 |
| 13 | Type A | 0 | 3 | 9 |
| 14 | Type A | 0 | 3 | 8 |
| 15 | Type A | 0 | 3 | 7 |
| 8** | Type B | 0 | 5 | 7 |
| 9** | Type B | 0 | 5 | 2 |
| 10** | Type B | 0 | 9 | 2 |
| 11** | Type B | 0 | 12 | 2 |

*Applicable only if scheduled with a CORESET residing within the first two symbols in the slot
**not applicable if CORESET not in the first two symbols of the slot In one embodiment, described herein is a method comprising configuring, via a broadcast channel, a physical downlink shared channel associated with a mobile device and configuring a data structure associated with the physical downlink shared channel corresponding to a physical downlink control channel. The method can also comprise sending the data structure to the mobile device to be utilized for physical downlink shared channel transmissions between the wireless network device and the mobile device. Additionally, the method can comprise transmitting a physical downlink shared channel transmission to the mobile device based on a condition associated with a radio resource control connection being determined to not have been satisfied.

According to another embodiment, a system can configure, via a broadcast channel, a physical downlink shared channel associated with a mobile device. The system can also send a first data structure to the mobile device to be utilized for a first physical downlink shared channel transmission between a wireless network device and the mobile device. Additionally, the system can comprise configuring a second data structure, resulting in a configured data structure that corresponds to a physical downlink control channel in response to a condition associated with a radio resource control connection being determined to have been satisfied. Furthermore, the system can send the configured data structure to the mobile device to be utilized for a second physical downlink shared channel transmission between the wireless network device and the mobile device.

According to yet another embodiment, described herein is a machine-readable storage medium that can perform the operations comprising facilitating receiving a data structure to be utilized for a first transmission associated with a first physical downlink shared channel between a wireless network device and the mobile device. The machine-readable storage medium can also perform the operations comprising facilitating establishing a radio resource control connection between the wireless network device and the mobile device. Additionally, the machine-readable storage medium can perform the operations comprising facilitating receiving a configured data structure to be utilized for a second transmission associated with a second physical downlink shared channel between the wireless network device and the mobile device in response to the facilitating the establishing the radio resource control connection.

These and other embodiments or implementations are described in more detail below with reference to the drawings.

Referring now to FIG. 1, illustrated is an example wireless communication system 100 in accordance with various aspects and embodiments of the subject disclosure. In one or more embodiments, system 100 can comprise one or more user equipment UEs 102. The non-limiting term user equipment can refer to any type of device that can communicate with a network node in a cellular or mobile communication system. A UE can have one or more antenna panels having vertical and horizontal elements. Examples of a UE comprise a target device, device to device (D2D) UE, machine type UE or UE capable of machine to machine (M2M) communications, personal digital assistant (PDA), tablet, mobile terminals, smart phone, laptop mounted equipment (LME), universal serial bus (USB) dongles enabled for mobile communications, a computer having mobile capabilities, a mobile device such as cellular phone, a laptop having laptop embedded equipment (LEE, such as a mobile broadband adapter), a tablet computer having a mobile broadband adapter, a wearable device, a virtual reality (VR) device, a heads-up display (HUD) device, a smart car, a machine-type communication (MTC) device, and the like. User equipment UE 102 can also comprise IOT devices that communicate wirelessly.

In various embodiments, system 100 is or comprises a wireless communication network serviced by one or more wireless communication network providers. In example embodiments, a UE 102 can be communicatively coupled to the wireless communication network via a network node 106. The network node (e.g., network node device) can communicate with user equipment (UE), thus providing connectivity between the UE and the wider cellular network. The UE 102 can send transmission type recommendation data to the network node 106. The transmission type recommendation data can comprise a recommendation to transmit data via a closed loop MIMO mode and/or a rank-1 precoder mode.

A network node can have a cabinet and other protected enclosures, an antenna mast, and multiple antennas for performing various transmission operations (e.g., MIMO operations). Network nodes can serve several cells, also called sectors, depending on the configuration and type of antenna. In example embodiments, the UE 102 can send and/or receive communication data via a wireless link to the network node 106. The dashed arrow lines from the network node 106 to the UE 102 represent downlink (DL) communications and the solid arrow lines from the UE 102 to the network nodes 104 represents an uplink (UL) communication.

System 100 can further include one or more communication service provider networks 108 that facilitate providing wireless communication services to various UEs, including UE 102, via the network node 106 and/or various additional network devices (not shown) included in the one or more communication service provider networks 108. The one or more communication service provider networks 108 can include various types of disparate networks, including but not limited to: cellular networks, femto networks, picocell networks, microcell networks, internet protocol (IP) networks Wi-Fi service networks, broadband service network, enterprise networks, cloud based networks, and the like. For example, in at least one implementation, system 100 can be or include a large scale wireless communication network that spans various geographic areas. According to this implementation, the one or more communication service provider networks 108 can be or include the wireless communication network and/or various additional devices and components of the wireless communication network (e.g., additional network devices and cell, additional UEs, network server devices, etc.). The network node 106 can be connected to the one or more communication service provider networks 108 via one or more backhaul links. For example, the one or more backhaul links can comprise wired link components, such as a T1/E1 phone line, a digital subscriber line (DSL) (e.g., either synchronous or asynchronous), an asymmetric DSL (ADSL), an optical fiber backbone, a coaxial cable, and the like. The one or more backhaul links can also include wireless link components, such as but not limited to, line-of-sight (LOS) or non-LOS links which can include terrestrial air-interfaces or deep space links (e.g., satellite communication links for navigation).

Wireless communication system 100 can employ various cellular systems, technologies, and modulation modes to facilitate wireless radio communications between devices (e.g., the UE 102 and the network node 106). While example embodiments might be described for 5G new radio (NR) systems, the embodiments can be applicable to any radio access technology (RAT) or multi-RAT system where the UE operates using multiple carriers e.g. LTE FDD/TDD, GSM/GERAN, CDMA2000 etc.

For example, system 100 can operate in accordance with global system for mobile communications (GSM), universal mobile telecommunications service (UMTS), long term evolution (LTE), LTE frequency division duplexing (LTE FDD, LTE time division duplexing (TDD), high speed packet access (HSPA), code division multiple access (CDMA), wideband CDMA (WCMDA), CDMA2000, time division multiple access (TDMA), frequency division multiple access (FDMA), multi-carrier code division multiple access (MC-CDMA), single-carrier code division multiple access (SC-CDMA), single-carrier FDMA (SC-FDMA), orthogonal frequency division multiplexing (OFDM), discrete Fourier transform spread OFDM (DFT-spread OFDM) single carrier FDMA (SC-FDMA), Filter bank based multi-carrier (FBMC), zero tail DFT-spread-OFDM (ZT DFT-s-OFDM), generalized frequency division multiplexing (GFDM), fixed mobile convergence (FMC), universal fixed mobile convergence (UFMC), unique word OFDM (UW-OFDM), unique word DFT-spread OFDM (UW DFT-Spread-OFDM), cyclic prefix OFDM CP-OFDM, resource-block-filtered OFDM, Wi Fi, WLAN, WiMax, and the like. However, various features and functionalities of system 100 are particularly described wherein the devices (e.g., the UEs 102 and the network device 104) of system 100 are configured to communicate wireless signals using one or more multi carrier modulation schemes, wherein data symbols can be transmitted simultaneously over multiple frequency subcarriers (e.g., OFDM, CP-OFDM, DFT-spread OFMD, UFMC, FMBC, etc.). The embodiments are applicable to single carrier as well as to multicarrier (MC) or carrier aggregation (CA) operation of the UE. The term carrier aggregation (CA) is also called (e.g. interchangeably called) "multi-carrier system", "multi-cell operation", "multi-carrier operation", "multi-carrier" transmission and/or reception. Note that some embodiments are also applicable for Multi RAB (radio bearers) on some carriers (that is data plus speech is simultaneously scheduled).

In various embodiments, system 100 can be configured to provide and employ 5G wireless networking features and functionalities. 5G wireless communication networks are expected to fulfill the demand of exponentially increasing data traffic and to allow people and machines to enjoy gigabit data rates with virtually zero latency. Compared to 4G, 5G supports more diverse traffic scenarios. For example, in addition to the various types of data communication between conventional UEs (e.g., phones, smartphones, tablets, PCs, televisions, Internet enabled televisions, etc.) supported by 4G networks, 5G networks can be employed to support data communication between smart cars in association with driverless car environments, as well as machine type communications (MTCs). Considering the drastic different communication needs of these different traffic scenarios, the ability to dynamically configure waveform parameters based on traffic scenarios while retaining the benefits of multi carrier modulation schemes (e.g., OFDM and related schemes) can provide a significant contribution to the high speed/capacity and low latency demands of 5G networks. With waveforms that split the bandwidth into several sub-bands, different types of services can be accommodated in different sub-bands with the most suitable waveform and numerology, leading to an improved spectrum utilization for 5G networks.

To meet the demand for data centric applications, features of proposed 5G networks may comprise: increased peak bit rate (e.g., 20 Gbps), larger data volume per unit area (e.g., high system spectral efficiency—for example about 3.5 times that of spectral efficiency of long term evolution (LTE) systems), high capacity that allows more device connectivity both concurrently and instantaneously, lower battery/power consumption (which reduces energy and consumption costs), better connectivity regardless of the geographic region in which a user is located, a larger numbers of devices, lower infrastructural development costs, and higher reliability of the communications. Thus, 5G networks may allow for: data rates of several tens of megabits per second should be supported for tens of thousands of users, 1 gigabit per second to be offered simultaneously to tens of workers on the same office floor, for example; several hundreds of thousands of simultaneous connections to be supported for massive sensor deployments; improved coverage, enhanced signaling efficiency; reduced latency compared to LTE.

The upcoming 5G access network may utilize higher frequencies (e.g., >6 GHz) to aid in increasing capacity. Currently, much of the millimeter wave (mmWave) spectrum, the band of spectrum between 30 gigahertz (Ghz) and 300 Ghz is underutilized. The millimeter waves have shorter wavelengths that range from 10 millimeters to 1 millimeter, and these mmWave signals experience severe path loss, penetration loss, and fading. However, the shorter wavelength at mmWave frequencies also allows more antennas to be packed in the same physical dimension, which allows for large-scale spatial multiplexing and highly directional beam forming.

Performance can be improved if both the transmitter and the receiver are equipped with multiple antennas. Multi-antenna techniques can significantly increase the data rates and reliability of a wireless communication system. The use of multiple input multiple output (MIMO) techniques, which was introduced in the third-generation partnership project (3GPP) and has been in use (including with LTE), is a multi-antenna technique that can improve the spectral efficiency of transmissions, thereby significantly boosting the overall data carrying capacity of wireless systems. The use of multiple-input multiple-output (MIMO) techniques can improve mmWave communications, and has been widely recognized a potentially important component for access networks operating in higher frequencies. MIMO can be used for achieving diversity gain, spatial multiplexing gain and beamforming gain. For these reasons, MIMO systems are an important part of the 3rd and 4th generation wireless systems, and are planned for use in 5G systems.

Figure 2:
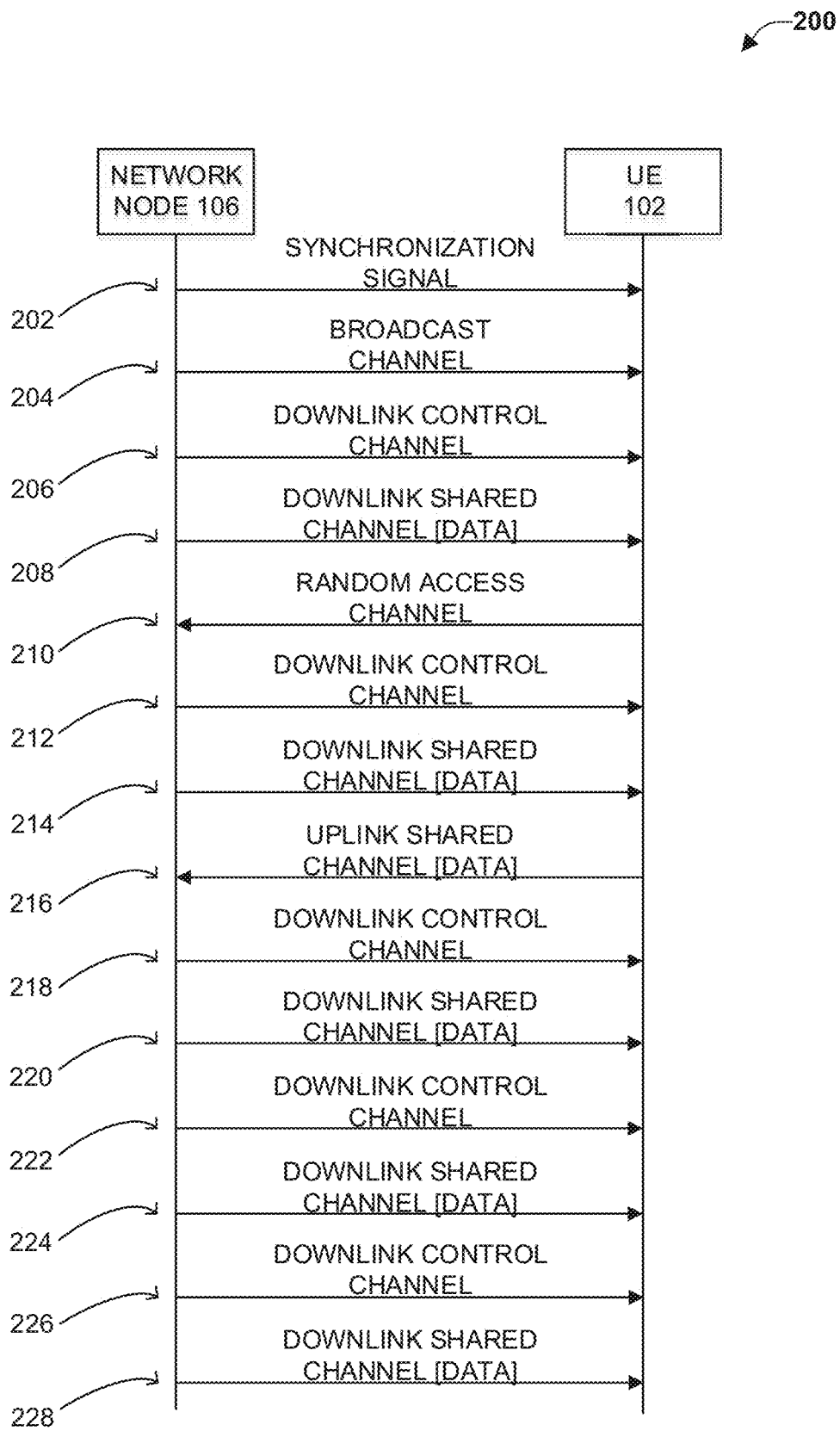
FIG. 2 illustrates an example schematic system block diagram of wireless communication between a base station device and a mobile device according to one or more embodiments.

Referring now to FIG. 2, illustrated is an example schematic system block diagram of wireless communication 200 between a base station device and a mobile device according to one or more embodiments.

In one embodiment, the UE 102 can be configured before it communicates with the network. The UE 102 can detect the network node 106 and acquire timing and frequency synchronization. Thus, the network node 106 can send a synchronization signal 202 to the UE 102 prior to sending data over a broadcast channel 204 to configure an NR PDCCH (e.g., downlink control channel 206). The broadcast channel 204 can configure the UE 102 on how to receive the downlink control channel 206. When the downlink control channel 206 schedules the downlink shared channel 208, the UE 102 can determine which signal to use by means of the downlink control channel 206 signaling which row of the table to use. Thus, a default table (e.g., Table 2, Table 4, etc.) can be sent to the UE for the first transmission on the broadcast channel 204. Consequently, a default table can be used during the downlink shared channel 208 transmission, then the payload of the downlink shared channel 208 can reconfigure the table, or if the payload does not reconfigure the table, the UE 102 can continue using the default table. The PDSCH can transmit remaining minimum system information (RMSI). During the first data transmission, the UE can use the default table, then the network can decide whether the UE is to continue using the default table or to use the reconfigured table. The default tables (e.g., Table 2, Table 4, etc.) can then be first configured (as later depicted by FIG. 3.), by a payload carried by the PDSCH 208, to use for subsequent PDSCH transmissions (e.g., 214, 220, 224, 228) until a dedicated RRC configuration is established.

Reconfiguration of the default tables (e.g., Table 2, Table 4, etc.) can result in new tables (e.g., Table 1, Table 3, etc.) After a dedicated RRC connection has been established and acknowledged, the UE 102 can either continue to use the tables configured by the PDSCH 208 for PDSCH resource allocation, or, alternatively, the dedicated RRC configuration can provide new tables for PDSCH resource allocation. Similarly, if the PDSCH 208 message does not provide a new table to use for subsequent PDSCH transmissions, the UE 102, can continue to use the default tables to demodulate the PDSCH 208. It should be noted that the table can be reconfigured at PDSCH 208 or at any PDSCH (e.g., 214, 220, 224, 228) at a later point. However, PDCCH 206 is the first chance for the network to configure the table (e.g., uses default table) so PDCCH 206 does not receive a reconfigured table, although PDCCH 206 can reconfigure the table for use at a later point.

Figure 3:
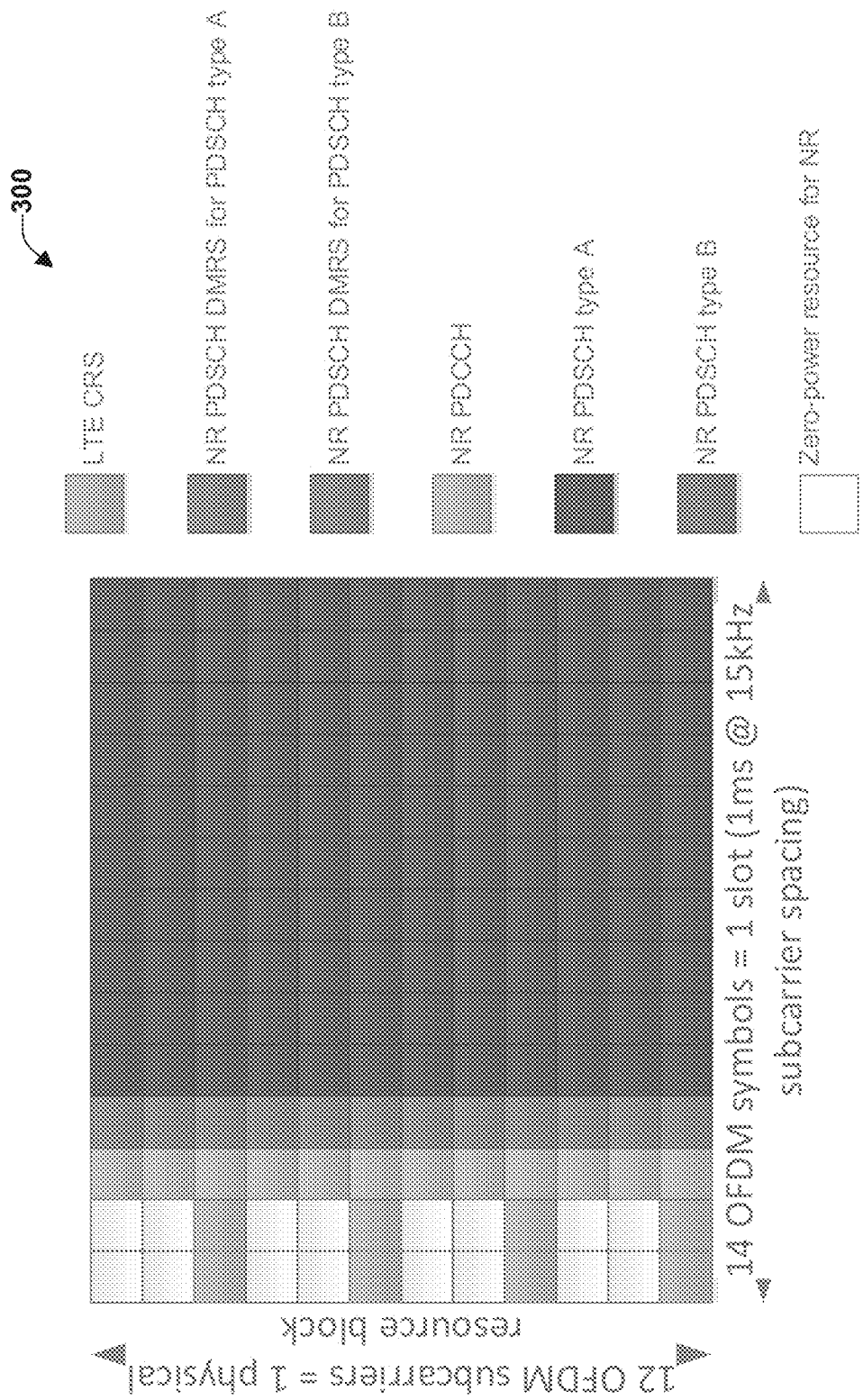
FIG. 3 illustrates an example schematic system block diagram of physical downlink shared channel mapping type A according to one or more embodiments.

Referring now to FIG. 3, illustrated is an example schematic system block diagram of physical downlink shared channel mapping type A 300 according to one or more embodiments.

FIG. 3 depicts a configuration where NR is scheduled in an MBSFN subframe. Tables 1-4, above, tell the UE on which symbols to look for the PDSCH. The initial block count (from left to right) starts at 0. Thus, for example, block 5 is representative of the $6^{th}$ symbol. To determine the symbol "S", determine the reference signal (e.g., NR PDSCH DMRS for PDSCH) block number. The length "L" then equals the number of reference signal blocks plus the number of PDSCH blocks. $K_0$ is typically 0, but if it is not 0, then there can be a slot gap between the NRPDCCH and the DMRS.

In 5G, the same spectrum can be used for legacy LTE and for the 5G. Historically, in order use the 5G spectrum, the legacy LTE spectrum can be turned off. However, in 5G, the spectrum can continue to be used for the legacy LTE and to deploy a 5G system on top of the same spectrum. FIG. 3 depicts an OFDM grid with 1 PRB and 14 symbols in the time domain on the horizontal axis and 12 subcarriers on the vertical axis is the frequency domain. The LTE CRS can be transmitted so that the 5G system has to coexist with the LTE CRS, which is why the 5G system does not use the first 2 two symbols. The first symbol that does not carry LTE CRS, for the 5G control system, is the NR PDCCH, then the 5G reference system can use the NR PDSCH DMRS for PDSCH type A.

NR can co-exist with LTE in overlapping spectrum in both normal and MBSFN LTE DL subframes. Hence, it can be possible to schedule NR PDSCH transmissions in subframes with CRS. After a dedicated RRC connection has been established, the LTE CRS pattern, including the MBSFN subframe configuration, can be known to the UE and the UE can rate match the NR PDSCH around the LTE CRS. Before the UE is configured with a dedicated RRC configuration, NR PDSCH transmissions can be confined to symbols between subsequent CRS transmissions. In MBSFN subframes, these are OFDM symbols 1-13 for one or two LTE CRS ports and OFDM symbols 2-13 otherwise. Moreover, some OFDM symbols without CRS can be reserved for NR PDCCH transmissions which can not be rate matched around LTE CRS. NR DMRS is not expected to collide with LTE CRS. This places restrictions on possible NR PDSCH time-domain resource allocations when NR and LTE are deployed in overlapping spectrum.

Figure 4:
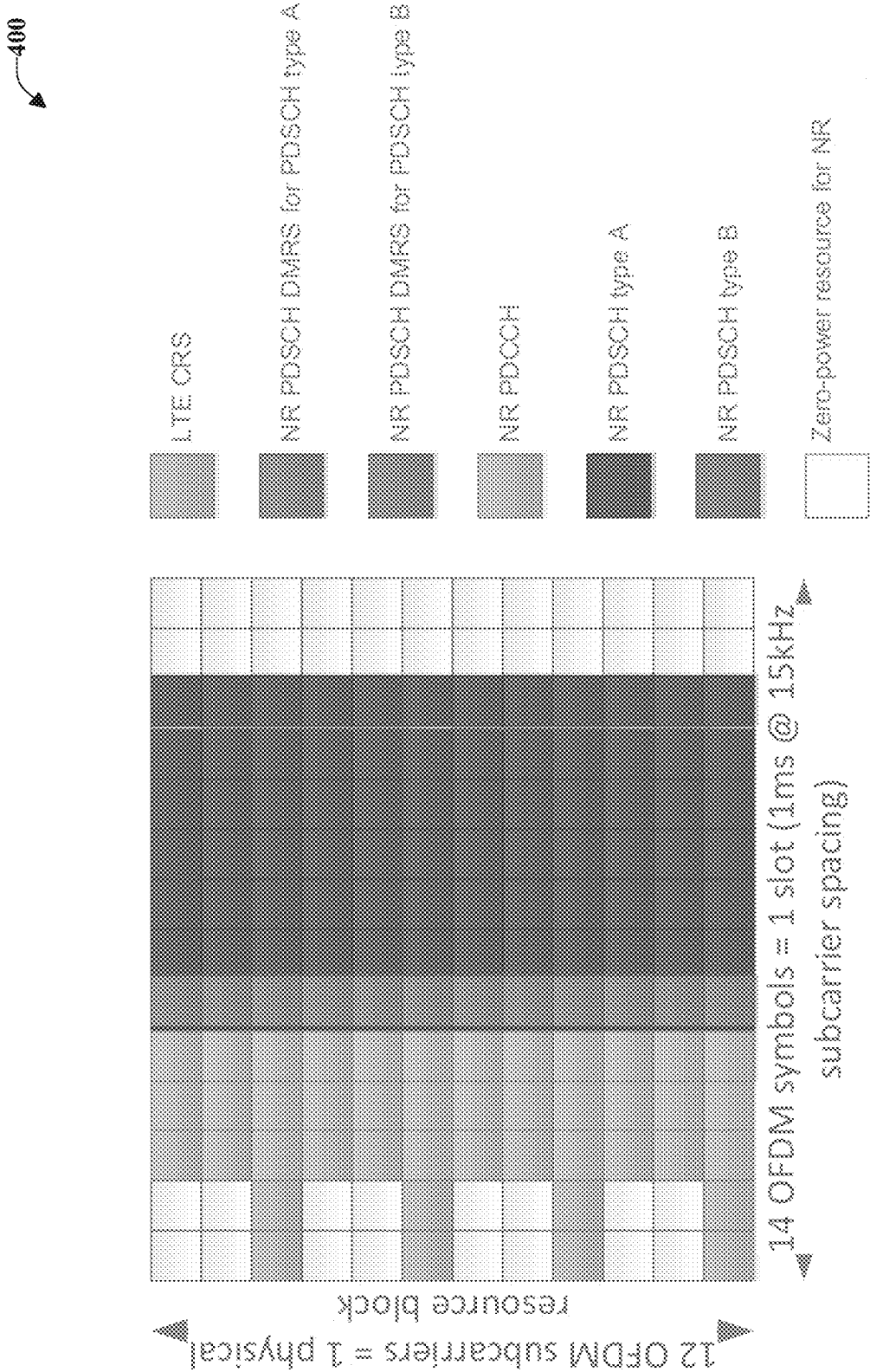
FIG. 4 illustrates an example schematic system block diagram of physical downlink shared channel mapping type B according to one or more embodiments.

Referring now to FIG. 4, illustrated is an example schematic system block diagram of physical downlink shared channel mapping type B 400 according to one or more embodiments.

FIG. 4 depicts PDCCH monitoring on any span of up to 3 consecutive OFDM symbols of a slot. For a given UE 102, search space configurations are within the same span of 3 consecutive OFDM symbols in the slot. The benefit of using PDCCH monitoring in conjunction with NR PDSCH mapping type A in LTE MBSFN subframes is that UEs 102 support the configuration. However, NR coverage can be limited with a single OFDM symbol for NR PDCCH, especially in 5 MHz carriers. Thus, PDCCH monitoring and PDSCH mapping type B can be used, which can allow an NR CORESET span of three OFDM symbols for coverage.

As in LTE, in 5G the control (e.g., up to 3 symbols) can be in the beginning of the subframe and the data at the end. Thus, in a type A configuration (e.g., FIG. 3 where the control symbols are the first three blocks and the data symbol begins on the fourth block), the first two blocks can be occupied by LTE, whereas the third block can be occupied by 5G. However, for a type B configuration, the control symbols can be limited to three, although they do not have do be at the beginning. Thus, the first two blocks can be occupied by LTE whereas, the third through the fifth blocks can be occupied by 5G. This causes the 5G reference signal (e.g. at symbol 6), and the 5G data beginning at block 7, to be shifted to the right of the grid. Consequently, the 5G system can have three symbols for coverage that do not occupy the LTE coverage symbols. Instead of 2 symbol control (e.g., 4 as the start symbol—Table 1) as depicted by FIG. 3, FIG. 4 depicts 3 symbol control (e.g., 5 as the start symbol—Table 3), which can provide more coverage.

Figure 5:
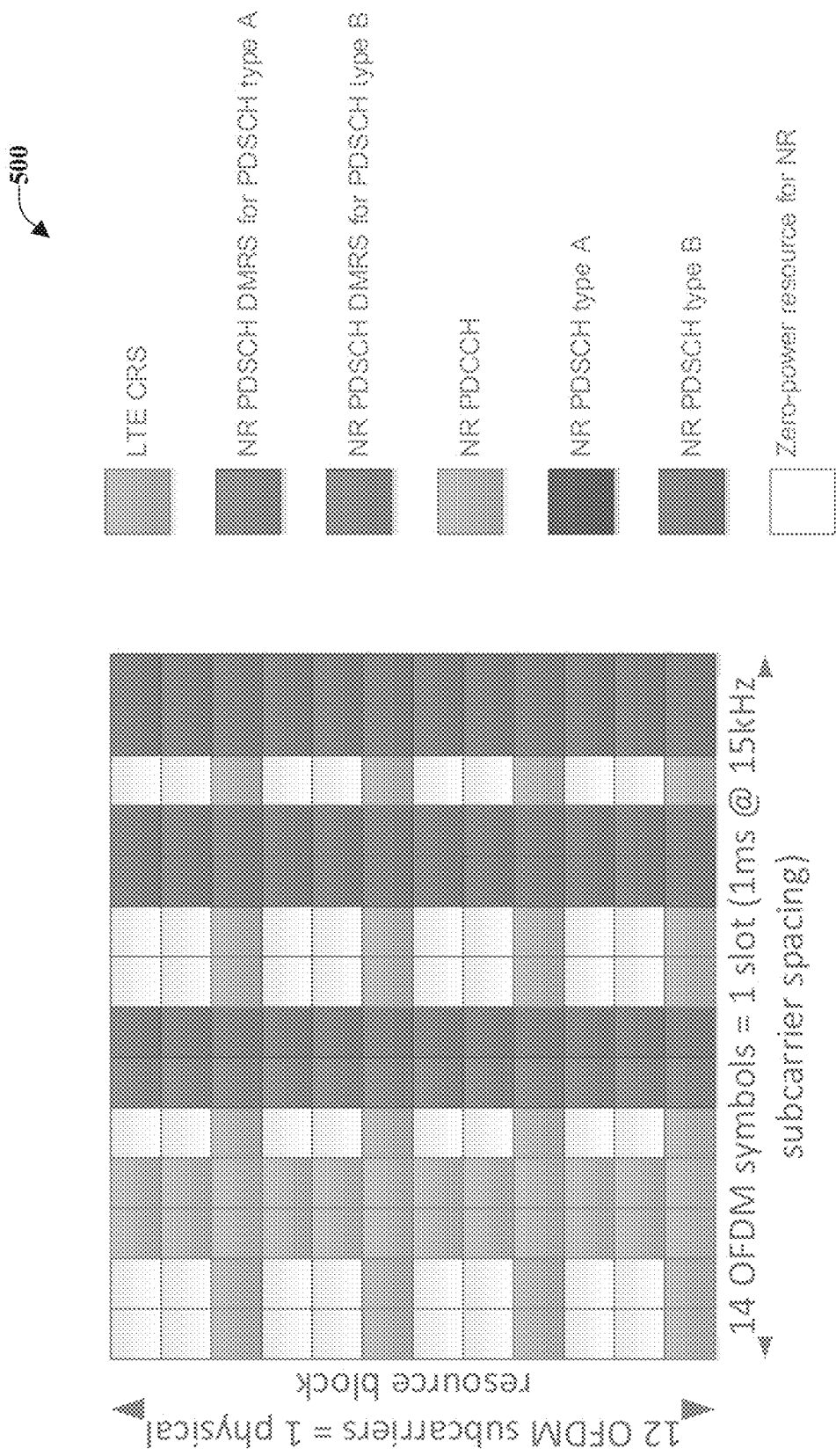
FIG. 5 illustrates an example schematic system block diagram of physical downlink shared channel mapping type B with normal long term evolution downlink subframes and rate matching according to one or more embodiments.
Figure 6:
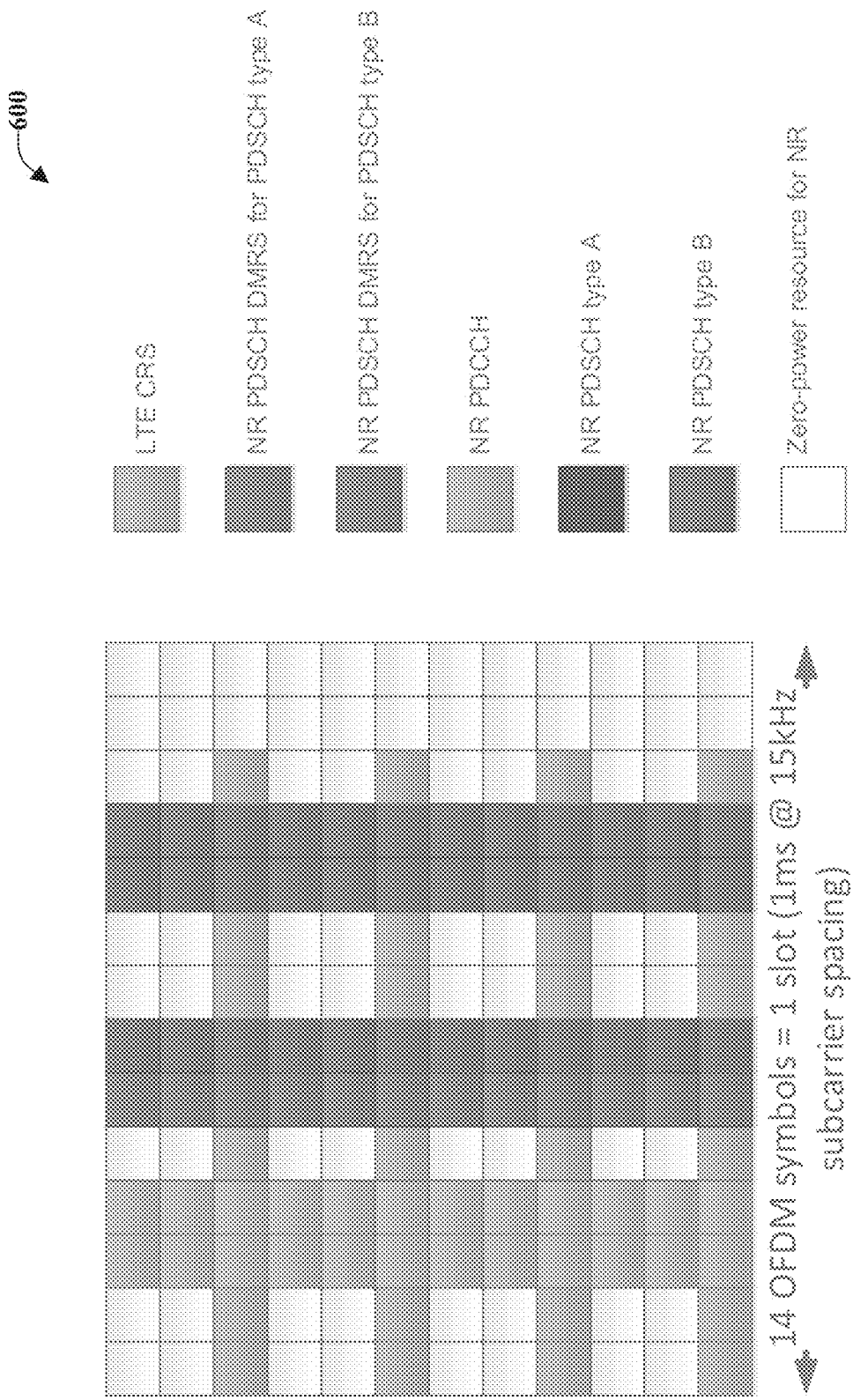
FIG. 6 illustrates an example schematic system block diagram of physical downlink shared channel mapping type B with normal long term evolution downlink subframes and rate matching according to one or more embodiments.

Referring now to FIGS. 5 and 6, illustrated are example schematic system block diagrams of physical downlink shared channel mapping type B with normal long term evolution downlink subframes and rate matching 500, 600 according to one or more embodiments. FIGS. 5 and 6 also depict a higher density with CRS throughout the subframe.

In yet another embodiment, a single PDSCH allocation can span across OFDM symbols with CRS, however, instead of rate matching around CRS at the RsE level, entire OFDM symbols can be rate matched as depicted in FIGS. 5 and 6. In this embodiment, a table can be defined, which in addition to the PDSCH mapping type (A or B) and the values for $K_0$, S and L also incorporate the OFDM symbol indices onto which the corresponding PDSCH is not mapped. In the example in FIG. 5, for instance, $K_0=0$, $S=5$, and $L=9$ and in FIG. 6 and $K_0=0$, $S=5$ and $L=7$, whereby in both cases OFDM symbols {7,8,11} are avoided. The benefit of this solution is reduced overhead. Because a single PDSCH allocation is used that avoids OFDM symbols carrying CRS, a single DMRS symbol and a single PDCCH control channel suffice for demodulating and scheduling the single PDSCH, respectively. Thus, type B starts at 5 and length at 7 applied to a normal downlink subframe and leaves the symbol to the CRS unoccupied. For type B, the length can be restricted to 2, 4, and 7. Therefore the NRPDSCH can be at symbol 7. For type A, the length can be any number between 1 to 14.

Figure 7:
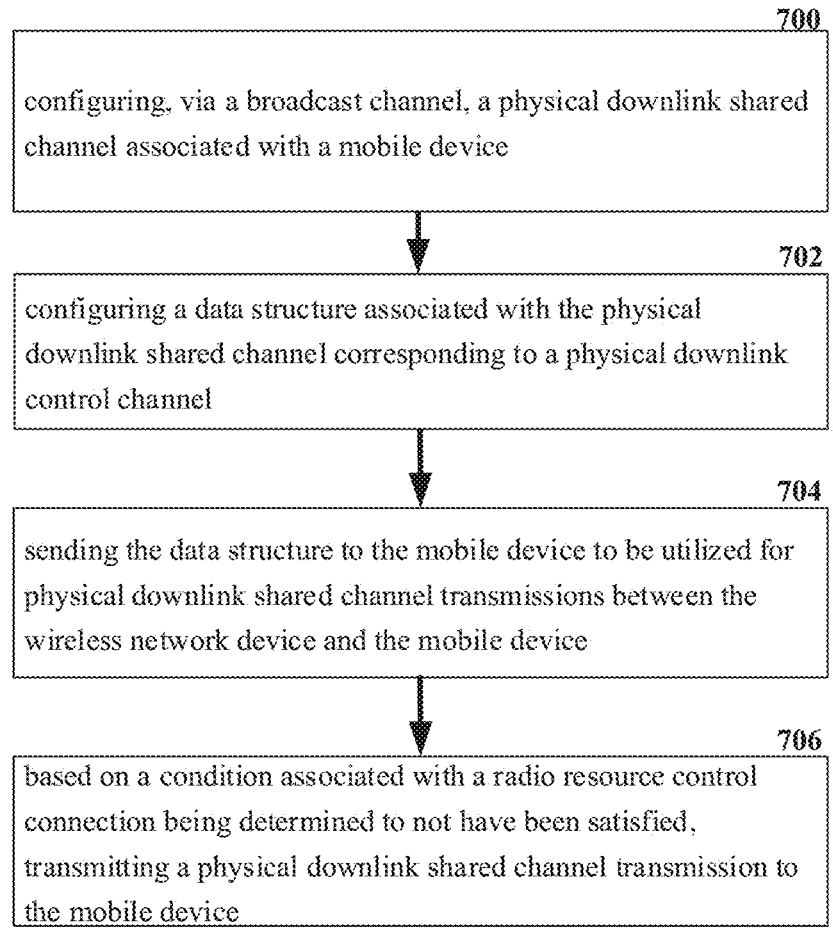
FIG. 7 illustrates an example flow diagram for a method of physical downlink shared channel time-domain resource allocation for a 5G network according to one or more embodiments.

Referring now to FIG. 7, illustrated is an example flow diagram for a method of physical downlink shared channel time-domain resource allocation for a 5G network according to one or more embodiments. At element 700, a method can comprise configuring via a broadcast channel 204, a physical downlink shared channel 208 associated with a mobile device (e.g., UE 102). The method can comprise configuring a data structure associated with the physical downlink shared channel 208 corresponding to a physical downlink control channel 206 at element 702. Element 704 can comprise sending the data structure (e.g., Table 1) to the mobile device (e.g., UE 102) to be utilized for physical downlink shared channel 208 transmissions between the wireless network device (e.g., network node 106) and the mobile device (e.g., UE 102). Additionally, at element 706, the method can comprise transmitting a physical downlink shared channel 208 transmission to the mobile device (e.g., UE 102) based on a condition associated with a radio resource control connection being determined to not have been satisfied.

Figure 8:
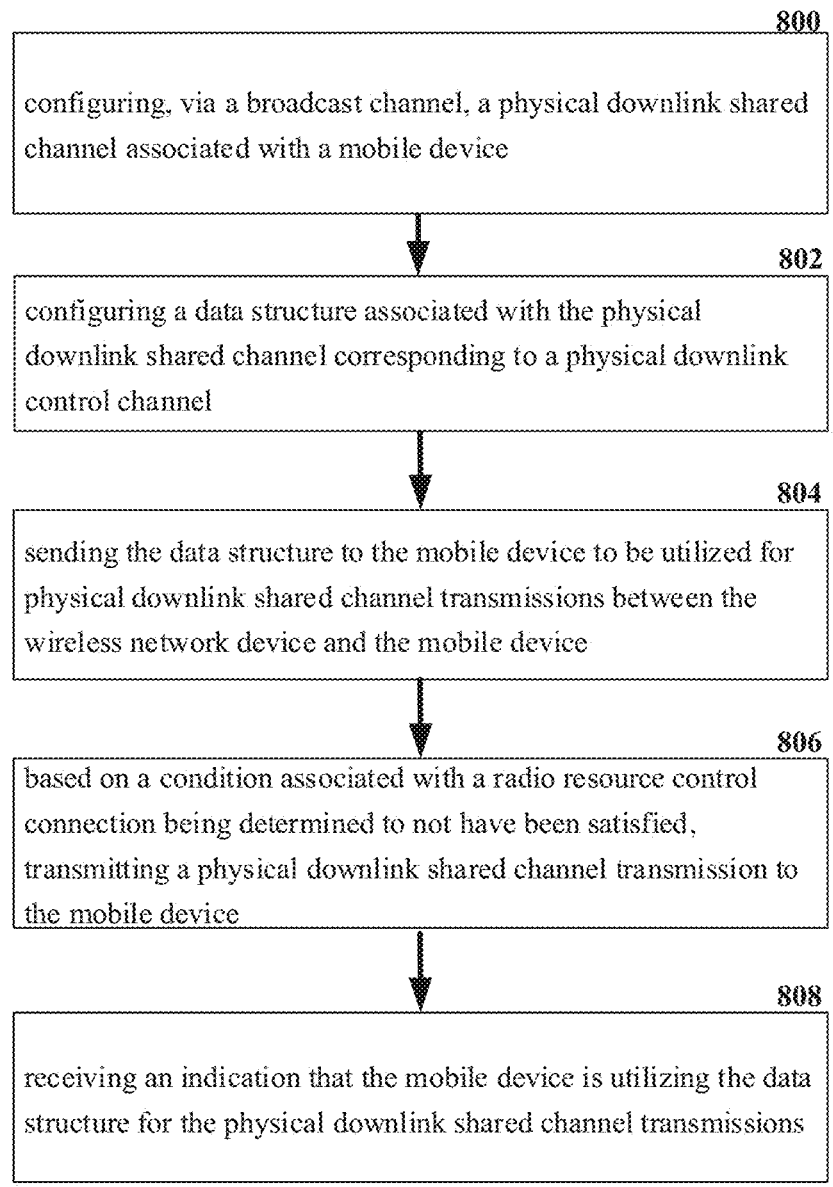
FIG. 8 illustrates an example flow diagram for a method of physical downlink shared channel time-domain resource allocation for a 5G network according to one or more embodiments.

Referring now to FIG. 8, illustrated is an example flow diagram for a method of physical downlink shared channel time-domain resource allocation for a 5G network according to one or more embodiments. At element 800, a method can comprise configuring via a broadcast channel 204, a physical downlink shared channel 208 associated with a mobile device (e.g., UE 102). The method can comprise configuring a data structure associated with the physical downlink shared channel 208 corresponding to a physical downlink control channel 206 at element 802. Element 804 can comprise sending the data structure (e.g., Table 1) to the mobile device (e.g., UE 102) to be utilized for physical downlink shared channel 208 transmissions between the wireless network device (e.g., network node 106) and the mobile device (e.g., UE 102). Additionally, at element 806, the method can comprise transmitting a physical downlink shared channel 208 transmission to the mobile device (e.g., UE 102) based on a condition associated with a radio resource control connection being determined to not have been satisfied. Furthermore, at element 808, the method can comprise receiving an indication that the mobile device (e.g., UE 102) is utilizing the data structure (e.g., Table 1) for the physical downlink shared channel 208 transmissions.

Figure 9:
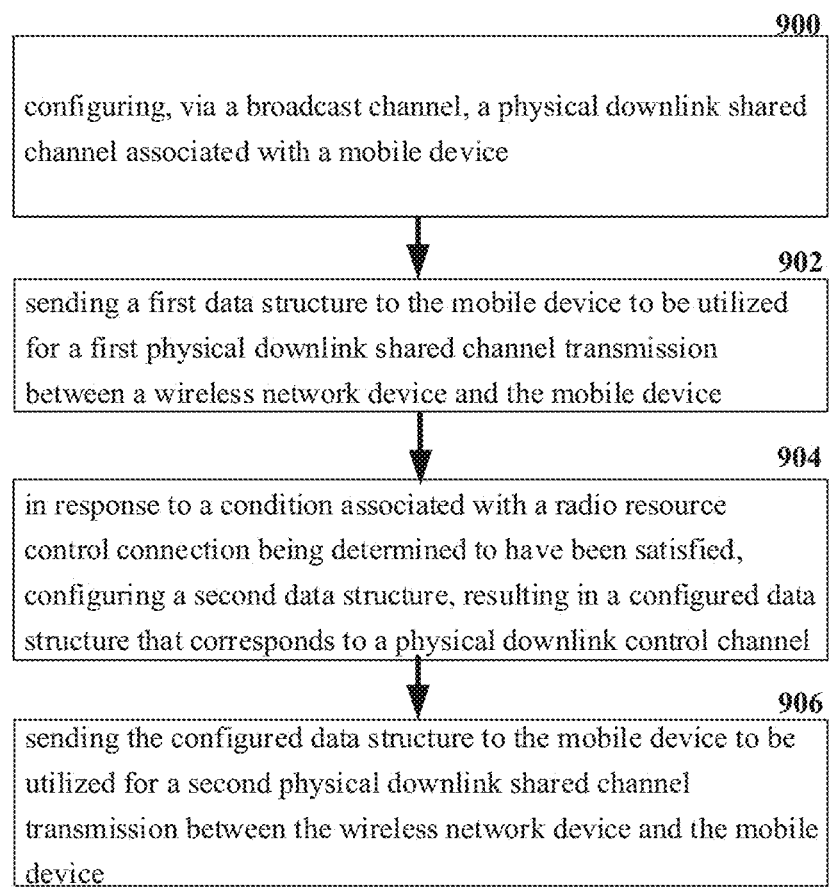
FIG. 9 illustrates an example flow diagram for a system for physical downlink shared channel time-domain resource allocation for a 5G network according to one or more embodiments.

Referring now to FIG. 9, illustrates an example flow diagram for a system for physical downlink shared channel time-domain resource allocation for a 5G network according to one or more embodiments. At element 900, a system can comprise configuring, via a broadcast channel 204, a physical downlink shared channel 208 associated with a mobile device (e.g., UE 102). Thereafter the system operations can comprise sending a first data structure (e.g., Table 1) to the mobile device (e.g., UE 102) to be utilized for a first physical downlink shared channel 208 transmission between a wireless network device (e.g., network node 106) and the mobile device (e.g., UE 102) at element 902. In response to a condition associated with a radio resource control connection being determined to have been satisfied, the system operations can comprise configuring a second data structure (e.g., Table 3), resulting in a configured data structure that corresponds to a physical downlink control channel 206 at element 904. Furthermore, at element 906, the system operations can comprise sending the configured data structure to the mobile device (e.g., UE 102) to be utilized for a second physical downlink shared channel transmission 214 between the wireless network device (e.g., network node 106) and the mobile device (e.g., UE 102).

Figure 10:
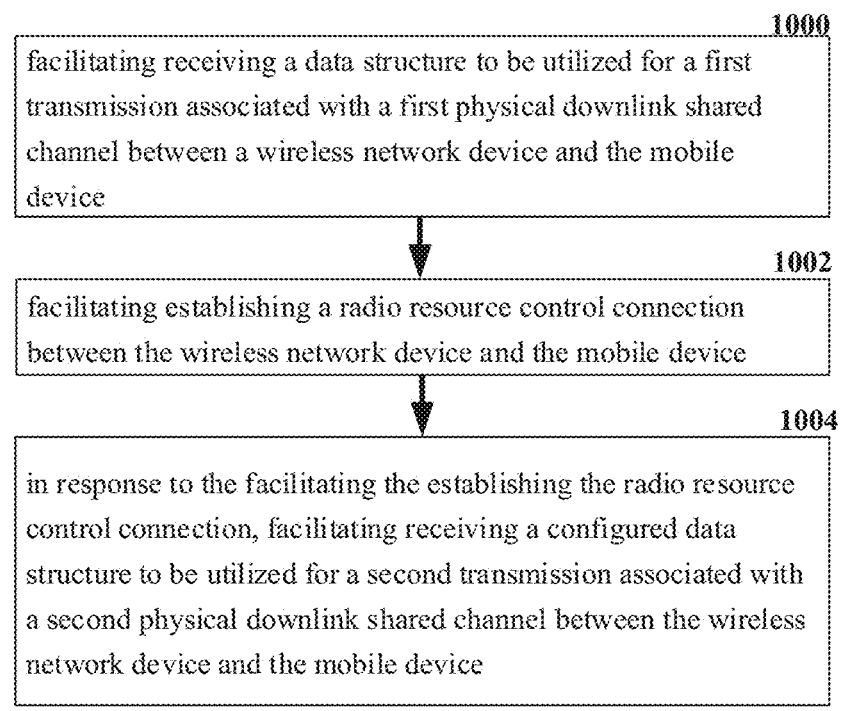
FIG. 10 illustrates an example flow diagram for machine-readable medium for physical downlink shared channel time-domain resource allocation for a 5G network according to one or more embodiments.

Referring now to FIG. 10, illustrated is an example flow diagram for machine-readable medium for physical downlink shared channel time-domain resource allocation for a 5G network according to one or more embodiments. At element 1000, the machine-readable medium can facilitate receiving a data structure (e.g., Table 1) to be utilized for a first transmission associated with a first physical downlink shared channel 208 between a wireless network device (e.g., network node 106) and the mobile device (e.g., UE 102). At element 1002, the machine-readable medium can facilitate establishing a radio resource control connection between the wireless network device (e.g., network node 106) and the mobile device (e.g., UE 102). In response to the facilitating the establishing the radio resource control connection, at element 1004, the machine-readable medium can facilitate receiving a configured data structure (e.g., Table 1, Table 2, etc.) to be utilized for a second transmission associated with a second physical downlink shared channel 214 between the wireless network device (e.g., network node 106) and the mobile device (e.g., 102).

Figure 11:
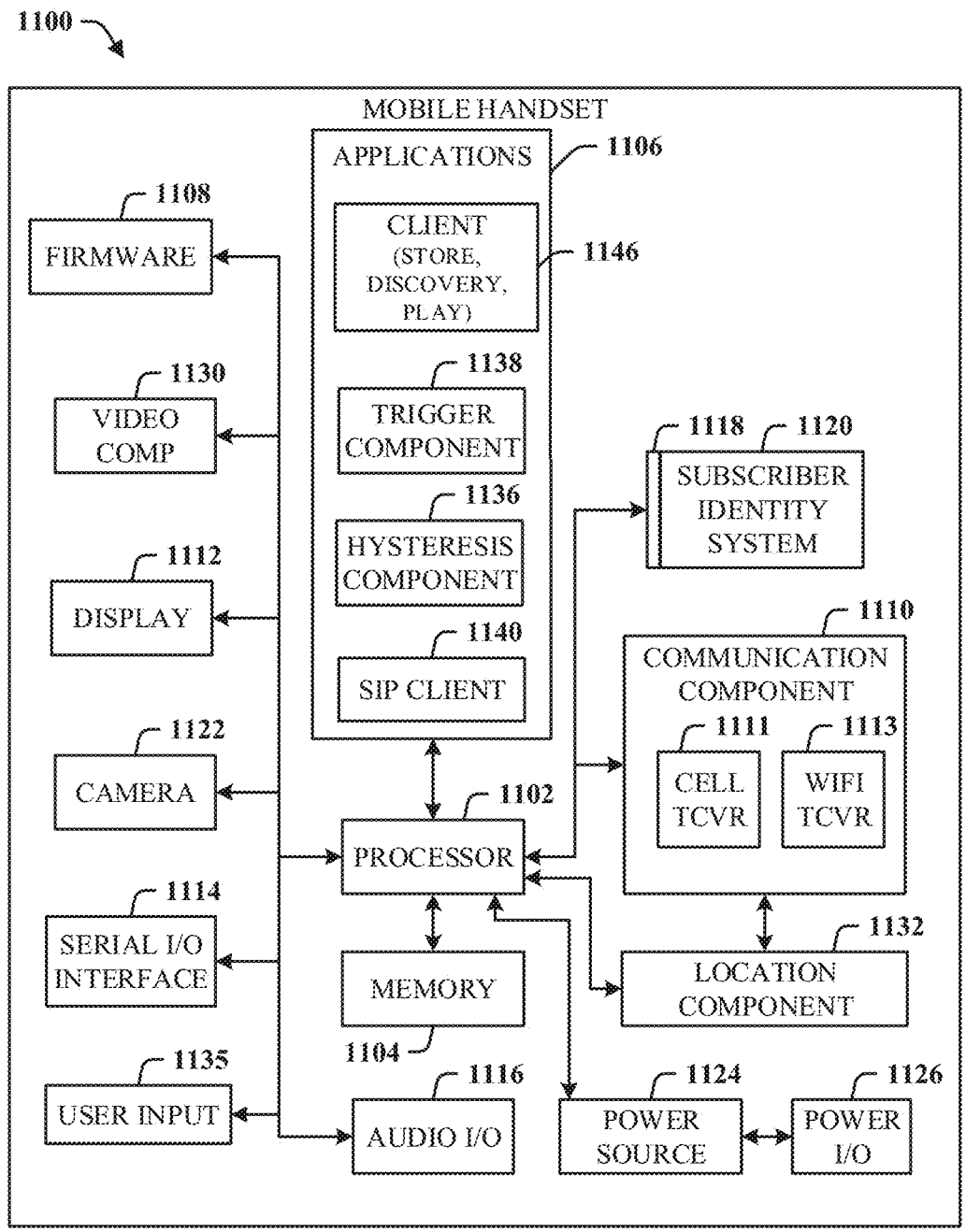
FIG. 11 illustrates an example block diagram of an example mobile handset operable to engage in a system architecture that facilitates secure wireless communication according to one or more embodiments described herein.

Referring now to FIG. 11, illustrated is a schematic block diagram of an exemplary end-user device such as a mobile device 1100 capable of connecting to a network in accordance with some embodiments described herein. Although a mobile handset 1100 is illustrated herein, it will be understood that other devices can be a mobile device, and that the mobile handset 1100 is merely illustrated to provide context for the embodiments of the various embodiments described herein. The following discussion is intended to provide a brief, general description of an example of a suitable environment 1100 in which the various embodiments can be implemented. While the description includes a general context of computer-executable instructions embodied on a machine-readable storage medium, those skilled in the art will recognize that the innovation also can be implemented in combination with other program modules and/or as a combination of hardware and software.

Generally, applications (e.g., program modules) can include routines, programs, components, data structures, etc., that perform particular tasks or implement particular abstract data types. Moreover, those skilled in the art will appreciate that the methods described herein can be practiced with other system configurations, including single-processor or multiprocessor systems, minicomputers, mainframe computers, as well as personal computers, hand-held computing devices, microprocessor-based or programmable consumer electronics, and the like, each of which can be operatively coupled to one or more associated devices.

A computing device can typically include a variety of machine-readable media. Machine-readable media can be any available media that can be accessed by the computer and includes both volatile and non-volatile media, removable and non-removable media. By way of example and not limitation, computer-readable media can comprise computer storage media and communication media. Computer storage media can include volatile and/or non-volatile media, removable and/or non-removable media implemented in any method or technology for storage of information, such as computer-readable instructions, data structures, program modules or other data. Computer storage media can include, but is not limited to, RAM, ROM, EEPROM, flash memory or other memory technology, CD ROM, digital video disk (DVD) or other optical disk storage, magnetic cassettes, magnetic tape, magnetic disk storage or other magnetic storage devices, or any other medium which can be used to store the desired information and which can be accessed by the computer.

Communication media typically embodies computer-readable instructions, data structures, program modules or other data in a modulated data signal such as a carrier wave or other transport mechanism, and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer-readable media.

The handset 1100 includes a processor 1102 for controlling and processing all onboard operations and functions. A memory 1104 interfaces to the processor 1102 for storage of data and one or more applications 1106 (e.g., a video player software, user feedback component software, etc.). Other applications can include voice recognition of predetermined voice commands that facilitate initiation of the user feedback signals. The applications 1106 can be stored in the memory 1104 and/or in a firmware 1108, and executed by the processor 1102 from either or both the memory 1104 or/and the firmware 1108. The firmware 1108 can also store startup code for execution in initializing the handset 1100. A communications component 1110 interfaces to the processor 1102 to facilitate wired/wireless communication with external systems, e.g., cellular networks, VoIP networks, and so on. Here, the communications component 1110 can also include a suitable cellular transceiver 1111 (e.g., a GSM transceiver) and/or an unlicensed transceiver 1113 (e.g., Wi-Fi, WiMax) for corresponding signal communications. The handset 1100 can be a device such as a cellular telephone, a PDA with mobile communications capabilities, and messaging-centric devices. The communications component 1110 also facilitates communications reception from terrestrial radio networks (e.g., broadcast), digital satellite radio networks, and Internet-based radio services networks.

The handset 1100 includes a display 1112 for displaying text, images, video, telephony functions (e.g., a Caller ID function), setup functions, and for user input. For example, the display 1112 can also be referred to as a "screen" that can accommodate the presentation of multimedia content (e.g., music metadata, messages, wallpaper, graphics, etc.). The display 1112 can also display videos and can facilitate the generation, editing and sharing of video quotes. A serial I/O interface 1114 is provided in communication with the processor 1102 to facilitate wired and/or wireless serial communications (e.g., USB, and/or IEEE 1394) through a hardwire connection, and other serial input devices (e.g., a keyboard, keypad, and mouse). This supports updating and troubleshooting the handset 1100, for example. Audio capabilities are provided with an audio I/O component 1116, which can include a speaker for the output of audio signals related to, for example, indication that the user pressed the proper key or key combination to initiate the user feedback signal. The audio I/O component 1116 also facilitates the input of audio signals through a microphone to record data and/or telephony voice data, and for inputting voice signals for telephone conversations.

The handset 1100 can include a slot interface 1118 for accommodating a SIC (Subscriber Identity Component) in the form factor of a card Subscriber Identity Module (SIM) or universal SIM 1120, and interfacing the SIM card 1120 with the processor 1102. However, it is to be appreciated that the SIM card 1120 can be manufactured into the handset 1100, and updated by downloading data and software.

The handset 1100 can process IP data traffic through the communication component 1110 to accommodate IP traffic from an IP network such as, for example, the Internet, a corporate intranet, a home network, a person area network, etc., through an ISP or broadband cable provider. Thus, VoIP traffic can be utilized by the handset 1100 and IP-based multimedia content can be received in either an encoded or decoded format.

A video processing component 1122 (e.g., a camera) can be provided for decoding encoded multimedia content. The video processing component 1122 can aid in facilitating the generation, editing and sharing of video quotes. The handset 1100 also includes a power source 1124 in the form of batteries and/or an AC power subsystem, which power source 1124 can interface to an external power system or charging equipment (not shown) by a power I/O component 1126.

The handset 1100 can also include a video component 1130 for processing video content received and, for recording and transmitting video content. For example, the video component 1130 can facilitate the generation, editing and sharing of video quotes. A location tracking component 1132 facilitates geographically locating the handset 1100. As described hereinabove, this can occur when the user initiates the feedback signal automatically or manually. A user input component 1134 facilitates the user initiating the quality feedback signal. The user input component 1134 can also facilitate the generation, editing and sharing of video quotes. The user input component 1134 can include such conventional input device technologies such as a keypad, keyboard, mouse, stylus pen, and/or touch screen, for example.

Referring again to the applications 1106, a hysteresis component 1136 facilitates the analysis and processing of hysteresis data, which is utilized to determine when to associate with the access point. A software trigger component 1138 can be provided that facilitates triggering of the hysteresis component 1138 when the Wi-Fi transceiver 1113 detects the beacon of the access point. A SIP client 1140 enables the handset 1100 to support SIP protocols and register the subscriber with the SIP registrar server. The applications 1106 can also include a client 1142 that provides at least the capability of discovery, play and store of multimedia content, for example, music.

The handset 1100, as indicated above related to the communications component 810, includes an indoor network radio transceiver 1113 (e.g., Wi-Fi transceiver). This function supports the indoor radio link, such as IEEE 802.11, for the dual-mode GSM handset 1100. The handset 1100 can accommodate at least satellite radio services through a handset that can combine wireless voice and digital radio chipsets into a single handheld device.

Figure 12:
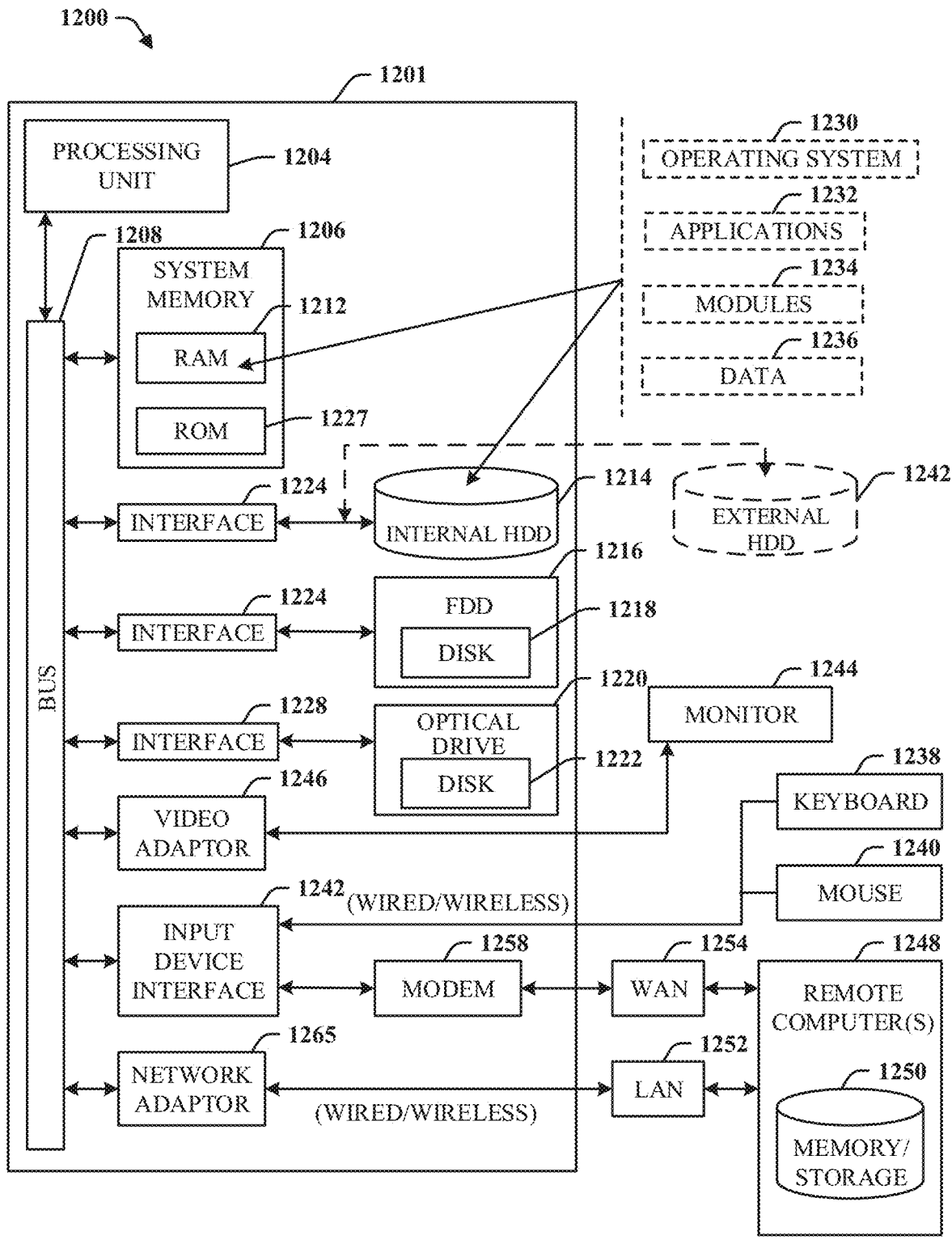
FIG. 12 illustrates an example block diagram of an example computer operable to engage in a system architecture that facilitates secure wireless communication according to one or more embodiments described herein.

Referring now to FIG. 12, there is illustrated a block diagram of a computer 1200 operable to execute a system architecture that facilitates establishing a transaction between an entity and a third party. The computer 1200 can provide networking and communication capabilities between a wired or wireless communication network and a server (e.g., Microsoft server) and/or communication device. In order to provide additional context for various aspects thereof, FIG. 12 and the following discussion are intended to provide a brief, general description of a suitable computing environment in which the various aspects of the innovation can be implemented to facilitate the establishment of a transaction between an entity and a third party. While the description above is in the general context of computer-executable instructions that can run on one or more computers, those skilled in the art will recognize that the innovation also can be implemented in combination with other program modules and/or as a combination of hardware and software.

Generally, program modules include routines, programs, components, data structures, etc., that perform particular tasks or implement particular abstract data types. Moreover, those skilled in the art will appreciate that the inventive methods can be practiced with other computer system configurations, including single-processor or multiprocessor computer systems, minicomputers, mainframe computers, as well as personal computers, hand-held computing devices, microprocessor-based or programmable consumer electronics, and the like, each of which can be operatively coupled to one or more associated devices.

The illustrated aspects of the innovation can also be practiced in distributed computing environments where certain tasks are performed by remote processing devices that are linked through a communications network. In a distributed computing environment, program modules can be located in both local and remote memory storage devices.

Computing devices typically include a variety of media, which can include computer-readable storage media or communications media, which two terms are used herein differently from one another as follows.

Computer-readable storage media can be any available storage media that can be accessed by the computer and includes both volatile and nonvolatile media, removable and non-removable media. By way of example, and not limitation, computer-readable storage media can be implemented in connection with any method or technology for storage of information such as computer-readable instructions, program modules, structured data, or unstructured data. Computer-readable storage media can include, but are not limited to, RAM, ROM, EEPROM, flash memory or other memory technology, CD-ROM, digital versatile disk (DVD) or other optical disk storage, magnetic cassettes, magnetic tape, magnetic disk storage or other magnetic storage devices, or other tangible and/or non-transitory media which can be used to store desired information. Computer-readable storage media can be accessed by one or more local or remote computing devices, e.g., via access requests, queries or other data retrieval protocols, for a variety of operations with respect to the information stored by the medium.

Communications media can embody computer-readable instructions, data structures, program modules or other structured or unstructured data in a data signal such as a modulated data signal, e.g., a carrier wave or other transport mechanism, and includes any information delivery or transport media. The term "modulated data signal" or signals refers to a signal that has one or more of its characteristics set or changed in such a manner as to encode information in one or more signals. By way of example, and not limitation, communication media include wired media, such as a wired network or direct-wired connection, and wireless media such as acoustic, RF, infrared and other wireless media.

With reference to FIG. 12, implementing various aspects described herein with regards to the end-user device can include a computer 1200, the computer 1200 including a processing unit 1204, a system memory 1206 and a system bus 1208. The system bus 1208 couples system components including, but not limited to, the system memory 1206 to the processing unit 1204. The processing unit 1204 can be any of various commercially available processors. Dual microprocessors and other multi processor architectures can also be employed as the processing unit 1204.

The system bus 1208 can be any of several types of bus structure that can further interconnect to a memory bus (with or without a memory controller), a peripheral bus, and a local bus using any of a variety of commercially available bus architectures. The system memory 1206 includes read-only memory (ROM) 1227 and random access memory (RAM) 1212. A basic input/output system (BIOS) is stored in a non-volatile memory 1227 such as ROM, EPROM, EEPROM, which BIOS contains the basic routines that help to transfer information between elements within the computer 1200, such as during start-up. The RAM 1212 can also include a high-speed RAM such as static RAM for caching data.

The computer 1200 further includes an internal hard disk drive (HDD) 1214 (e.g., EIDE, SATA), which internal hard disk drive 1214 can also be configured for external use in a suitable chassis (not shown), a magnetic floppy disk drive (FDD) 1216, (e.g., to read from or write to a removable diskette 1218) and an optical disk drive 1220, (e.g., reading a CD-ROM disk 1222 or, to read from or write to other high capacity optical media such as the DVD). The hard disk drive 1214, magnetic disk drive 1216 and optical disk drive 1220 can be connected to the system bus 1208 by a hard disk drive interface 1224, a magnetic disk drive interface 1226 and an optical drive interface 1228, respectively. The interface 1224 for external drive implementations includes at least one or both of Universal Serial Bus (USB) and IEEE 1294 interface technologies. Other external drive connection technologies are within contemplation of the subject innovation.

The drives and their associated computer-readable media provide nonvolatile storage of data, data structures, computer-executable instructions, and so forth. For the computer 1200 the drives and media accommodate the storage of any data in a suitable digital format. Although the description of computer-readable media above refers to a HDD, a removable magnetic diskette, and a removable optical media such as a CD or DVD, it should be appreciated by those skilled in the art that other types of media which are readable by a computer 1200, such as zip drives, magnetic cassettes, flash memory cards, cartridges, and the like, can also be used in the exemplary operating environment, and further, that any such media can contain computer-executable instructions for performing the methods of the disclosed innovation.

A number of program modules can be stored in the drives and RAM 1212, including an operating system 1230, one or more application programs 1232, other program modules 1234 and program data 1236. All or portions of the operating system, applications, modules, and/or data can also be cached in the RAM 1212. It is to be appreciated that the innovation can be implemented with various commercially available operating systems or combinations of operating systems.

A user can enter commands and information into the computer 1200 through one or more wired/wireless input devices, e.g., a keyboard 1238 and a pointing device, such as a mouse 1240. Other input devices (not shown) may include a microphone, an IR remote control, a joystick, a game pad, a stylus pen, touch screen, or the like. These and other input devices are often connected to the processing unit 1204 through an input device interface 1242 that is coupled to the system bus 1208, but can be connected by other interfaces, such as a parallel port, an IEEE 2394 serial port, a game port, a USB port, an IR interface, etc.

A monitor 1244 or other type of display device is also connected to the system bus 1208 through an interface, such as a video adapter 1246. In addition to the monitor 1244, a computer 1200 typically includes other peripheral output devices (not shown), such as speakers, printers, etc.

The computer 1200 can operate in a networked environment using logical connections by wired and/or wireless communications to one or more remote computers, such as a remote computer(s) 1248. The remote computer(s) 1248 can be a workstation, a server computer, a router, a personal computer, portable computer, microprocessor-based entertainment device, a peer device or other common network node, and typically includes many or all of the elements described relative to the computer, although, for purposes of brevity, only a memory/storage device 1250 is illustrated. The logical connections depicted include wired/wireless connectivity to a local area network (LAN) 1252 and/or larger networks, e.g., a wide area network (WAN) 1254. Such LAN and WAN networking environments are commonplace in offices and companies, and facilitate enterprise-wide computer networks, such as intranets, all of which may connect to a global communications network, e.g., the Internet.

When used in a LAN networking environment, the computer 1200 is connected to the local network 1252 through a wired and/or wireless communication network interface or adapter 1256. The adapter 1256 may facilitate wired or wireless communication to the LAN 1252, which may also include a wireless access point disposed thereon for communicating with the wireless adapter 1256.

When used in a WAN networking environment, the computer 1200 can include a modem 1258, or is connected to a communications server on the WAN 1254, or has other means for establishing communications over the WAN 1254, such as by way of the Internet. The modem 1258, which can be internal or external and a wired or wireless device, is connected to the system bus 1208 through the input device interface 1242. In a networked environment, program modules depicted relative to the computer, or portions thereof, can be stored in the remote memory/storage device 1250. It will be appreciated that the network connections shown are exemplary and other means of establishing a communications link between the computers can be used.

The computer is operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, restroom), and telephone. This includes at least Wi-Fi and Bluetooth™ wireless technologies. Thus, the communication can be a predefined structure as with a conventional network or simply an ad hoc communication between at least two devices.

Wi-Fi, or Wireless Fidelity, allows connection to the Internet from a couch at home, a bed in a hotel room, or a conference room at work, without wires. Wi-Fi is a wireless technology similar to that used in a cell phone that enables such devices, e.g., computers, to send and receive data indoors and out; anywhere within the range of a base station. Wi-Fi networks use radio technologies called IEEE 802.11 (a, b, g, etc.) to provide secure, reliable, fast wireless connectivity. A Wi-Fi network can be used to connect computers to each other, to the Internet, and to wired networks (which use IEEE 802.3 or Ethernet). Wi-Fi networks operate in the unlicensed 2.4 and 5 GHz radio bands, at an 11 Mbps (802.11a) or 54 Mbps (802.11b) data rate, for example, or with products that contain both bands (dual band), so the networks can provide real-world performance similar to the basic 10BaseT wired Ethernet networks used in many offices.

The above description of illustrated embodiments of the subject disclosure, including what is described in the Abstract, is not intended to be exhaustive or to limit the disclosed embodiments to the precise forms disclosed. While specific embodiments and examples are described herein for illustrative purposes, various modifications are possible that are considered within the scope of such embodiments and examples, as those skilled in the relevant art can recognize.

In this regard, while the subject matter has been described herein in connection with various embodiments and corresponding FIGs, where applicable, it is to be understood that other similar embodiments can be used or modifications and additions can be made to the described embodiments for performing the same, similar, alternative, or substitute function of the disclosed subject matter without deviating therefrom. Therefore, the disclosed subject matter should not be limited to any single embodiment described herein, but rather should be construed in breadth and scope in accordance with the appended claims below.

What is claimed is:

1. A method, comprising:
   sending, by network equipment comprising a processor, synchronization signal data associated with a timing synchronization and a frequency synchronization to a user equipment;
   configuring, by the network equipment, via a broadcast channel, a physical downlink shared channel associated with the user equipment;
   configuring, by the network equipment, a data structure associated with the physical downlink shared channel corresponding to a physical downlink control channel;
   sending, by the network equipment, the data structure to the user equipment to be utilized for physical downlink shared channel transmissions between the network equipment and the user equipment; and
   based on a condition associated with a radio resource control connection being determined to not have been satisfied, transmitting, by the network equipment, a physical downlink shared channel transmission, of the physical downlink shared channel transmissions, to the user equipment, wherein the physical downlink shared channel transmission comprises remaining minimum system data to be used for a first subsequent physical downlink shared channel transmission;
   in response to receiving the first subsequent physical downlink shared channel transmission utilizing the configured data structure, reconfiguring, by the network equipment, the data structure for a second subsequent physical downlink shared channel transmission, resulting in a reconfigured data structure; and
   utilizing, by the network equipment, the reconfigured data structure in accordance with the second subsequent physical downlink shared channel transmission prior to a dedicated radio resource control configuration being determined.

2. The method of claim 1, wherein the condition associated with the radio resource control connection being determined to not have been satisfied comprises the radio resource control connection between the user equipment and the network equipment being determined to have been established.

3. The method of claim 2, further comprising:
   receiving, by the network equipment, an indication that the user equipment is utilizing the reconfigured data structure for the physical downlink shared channel transmissions.

4. The method of claim 1, wherein the physical downlink shared channel transmissions comprise symbol data representative of one or more symbols to be sent to the user equipment.

5. The method of claim 1, wherein the data structure comprises a start value of five, representative of a sixth symbol within a slot, associated with the physical downlink shared channel.

6. The method of claim 5, wherein the sixth symbol indicates a mapping type of the physical downlink shared channel.

7. The method of claim 1, wherein the data structure comprises a length value of seven, the length value of seven being associated with a twelve symbol configuration for the physical downlink shared channel.

8. The method of claim 1, wherein the reconfigured data structure indicates to the user equipment a starting symbol associated with the second subsequent physical downlink shared transmission.

9. A system, comprising:
   a processor; and
   a memory that stores executable instructions that, when executed by the processor, facilitate performance of operations, comprising:
   in response to a user equipment being determined to have detected network equipment, sending synchronization signal data associated with a timing and frequency synchronization signal to the user equipment;
   based on the synchronization signal data, configuring, via a broadcast channel, a physical downlink shared channel associated with the user equipment;
   sending a first data structure to the user equipment to be utilized for a first physical downlink shared channel transmission between the network equipment and the user equipment;
   in response to a condition associated with a radio resource control connection being determined to have been satisfied, configuring a second data structure, resulting in a configured data structure that corresponds to a physical downlink control channel;
   sending the configured data structure to the user equipment to be utilized for a second physical downlink shared channel transmission between the network equipment and the user equipment, wherein the second physical downlink shared channel transmission comprises remaining minimum system data to be used for a first subsequent physical downlink shared channel transmission;

in response to receiving the first subsequent physical downlink shared channel transmission utilizing the configured data structure, reconfiguring the data structure for a second subsequent physical downlink shared channel transmission, resulting in a reconfigured data structure; and utilizing the reconfigured data structure in accordance with the second subsequent physical downlink shared channel transmission prior to a dedicated radio resource control configuration being determined.

10. The system of claim 9, wherein the first data structure comprises a start value of four, representative of a fifth symbol associated with the first physical downlink shared channel.

11. The system of claim 9, wherein the second data structure comprises a start value of five, representative of a sixth symbol associated with the second physical downlink shared channel.

12. The system of claim 11, wherein the sixth symbol is representative of a mapping type of the physical downlink shared channel.

13. The system of claim 9, wherein the condition comprises determining that the radio resource control connection between the user equipment and the network equipment has been made.

14. A non-transitory machine-readable medium, comprising executable instructions that, when executed by a processor of a mobile device, facilitate performance of operations, comprising:

facilitating, by a mobile device, detecting network equipment;

in response to facilitating the detecting the network equipment, facilitating receiving synchronization data associated with a timing and frequency synchronization from the network equipment;

facilitating receiving a data structure to be utilized for a first transmission associated with a first physical downlink shared channel between the network equipment and the mobile device;

facilitating establishing a radio resource control connection between the network equipment and the mobile device;

in response to facilitating the establishing of the radio resource control connection, facilitating receiving a configured data structure to be utilized for a second transmission associated with a second physical downlink shared channel between the network equipment and the mobile device, wherein the second transmission comprises remaining minimum system data to be used for a first subsequent physical downlink shared channel transmission;

in response to receiving the first subsequent physical downlink shared channel transmission utilizing the configured data structure, facilitating reconfiguring the configured data structure for a second subsequent physical downlink shared channel transmission, resulting in a reconfigured data structure; and utilizing the reconfigured data structure in accordance with the second subsequent physical downlink shared channel transmission prior to a dedicated radio resource control configuration being determined.

15. The non-transitory machine-readable medium of claim 14, wherein the operations further comprise:

configuring, via a broadcast channel, the first physical downlink shared channel between the network equipment and the mobile device.

16. The non-transitory machine-readable medium of claim 14, wherein the data structure comprises a start value of four, representative of a fifth symbol associated with the first physical downlink shared channel.

17. The non-transitory machine-readable medium of claim 14, wherein the reconfigured data structure comprises a start value of five, representative of a sixth symbol associated with the second physical downlink shared channel.

18. The non-transitory machine-readable medium of claim 14, wherein the data structure is a default data structure to be utilized by the mobile device in an absence of the configured data structure.

19. The non-transitory machine-readable medium of claim 14, wherein the operations further comprise:

utilizing the reconfigured data structure, facilitating obtaining an allocation of a resource, associated with the reconfigured data structure, for the mobile device.

20. The method of claim 1, wherein the data structure is a first data structure, and further comprising:

Determining, by the network equipment, that the radio resource control connection between the user equipment and the network equipment has been made.

\* \* \* \* \*